United States Patent
Nakayama et al.

(10) Patent No.: US 9,257,081 B2
(45) Date of Patent: Feb. 9, 2016

(54) TWO-SCREEN DISPLAY DEVICE

(75) Inventors: Akio Nakayama, Tokyo (JP);
Yoshimitsu Ishikawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 564 days.

(21) Appl. No.: 13/566,443

(22) Filed: Aug. 3, 2012

(65) Prior Publication Data

US 2013/0155034 A1 Jun. 20, 2013

(30) Foreign Application Priority Data

Dec. 14, 2011 (JP) ................................ 2011-273175

(51) Int. Cl.
*G09G 3/36* (2006.01)
*G02B 27/22* (2006.01)
*G09F 9/35* (2006.01)
*G09F 19/14* (2006.01)
*G02F 1/13* (2006.01)
*G02F 1/1343* (2006.01)
*H04N 13/04* (2006.01)

(52) U.S. Cl.
CPC .......... *G09G 3/3614* (2013.01); *G02B 27/2214* (2013.01); *G02F 1/1323* (2013.01); *G02F 1/1343* (2013.01); *G09F 9/35* (2013.01); *G09F 19/14* (2013.01); *G09G 3/3648* (2013.01); *H04N 13/0409* (2013.01); *G02F 2001/134345* (2013.01)

(58) Field of Classification Search
None
See application file for complete search history.

(56) References Cited

U.S. PATENT DOCUMENTS

| 4,989,060 | A | * | 1/1991 | Usui ............................. 257/223 |
| 5,315,377 | A | * | 5/1994 | Isono et al. ..................... 348/51 |
| 6,392,690 | B1 | * | 5/2002 | Fujii et al. ...................... 348/59 |
| 7,936,323 | B2 | * | 5/2011 | Mori .................... G09G 3/3648 345/87 |
| 8,045,270 | B2 | * | 10/2011 | Shin et al. ..................... 359/619 |
| 8,378,952 | B2 | * | 2/2013 | Kim ..................... G09G 3/3648 345/100 |
| 2003/0206343 | A1 | * | 11/2003 | Morishima ........ G02B 27/2214 359/463 |
| 2004/0169919 | A1 | | 9/2004 | Uehara et al. |

(Continued)

FOREIGN PATENT DOCUMENTS

| CN | 1525212 A | 9/2004 |
| CN | 101216649 A | 7/2008 |

(Continued)

OTHER PUBLICATIONS

"Dual-view liquid crystal and Triple-view liquid crystal", Sharp Technical Journal, No. 96, Nov. 2007, 3 pages.

(Continued)

*Primary Examiner* — Antonio Xavier
(74) *Attorney, Agent, or Firm* — Oblon, McClelland, Maier & Neustadt, L.L.P.

(57) ABSTRACT

A two-screen display device, in which an increase of production cost can be suppressed while the same resolution as an image of a usual (one-screen display) device is maintained, is provided. In a liquid crystal display panel of the two-screen display device, each of a first sub-pixel for first image and a second sub-pixel for second image has an aspect ratio of about 6:1. A source line supplies an image signal to both the first sub-pixel and the second sub-pixel. Each row of the sub-pixel includes a gate line (first gate line) that drives the first sub-pixel and a gate line (second gate line) that drives the second sub-pixel. An opening of a parallax barrier is disposed in a region between the first sub-pixel and the second sub-pixel.

7 Claims, 15 Drawing Sheets

(56) References Cited

U.S. PATENT DOCUMENTS

| | | | |
|---|---|---|---|
| 2005/0073577 A1* | 4/2005 | Sudo et al. | 348/51 |
| 2005/0200258 A1* | 9/2005 | Kim et al. | 313/292 |
| 2005/0243253 A1 | 11/2005 | Imai et al. | |
| 2006/0268185 A1* | 11/2006 | Hamagishi et al. | 349/15 |
| 2007/0097057 A1* | 5/2007 | Shin | 345/98 |
| 2008/0165296 A1* | 7/2008 | Kim et al. | 349/15 |
| 2008/0238898 A1* | 10/2008 | Yamanaka et al. | 345/204 |
| 2009/0058845 A1* | 3/2009 | Fukuda et al. | 345/214 |
| 2009/0096943 A1 | 4/2009 | Uehara et al. | |
| 2009/0147178 A1* | 6/2009 | Ahn et al. | 349/62 |
| 2009/0179893 A1* | 7/2009 | Nakamura | 345/419 |
| 2009/0195489 A1 | 8/2009 | Hung et al. | |
| 2009/0201313 A1* | 8/2009 | Thorn | 345/620 |
| 2009/0279025 A1* | 11/2009 | Machidori et al. | 349/110 |
| 2010/0091206 A1* | 4/2010 | Chapman | 349/15 |
| 2010/0118058 A1* | 5/2010 | Murai et al. | 345/690 |
| 2010/0156773 A1 | 6/2010 | Uehara et al. | |
| 2010/0231604 A1* | 9/2010 | Lin et al. | 345/596 |
| 2011/0037782 A1* | 2/2011 | Tsai et al. | 345/690 |
| 2011/0069046 A1 | 3/2011 | Ko et al. | |
| 2011/0187832 A1* | 8/2011 | Yoshida | A63F 13/02 348/46 |
| 2011/0221655 A1 | 9/2011 | Fukui | |
| 2011/0221729 A1* | 9/2011 | Chuang et al. | 345/211 |
| 2011/0285613 A1* | 11/2011 | Ben-David et al. | 345/88 |
| 2011/0285950 A1 | 11/2011 | Su et al. | |
| 2011/0304601 A1* | 12/2011 | Niioka et al. | 345/209 |
| 2012/0212486 A1* | 8/2012 | Van Der Horst et al. | 345/419 |
| 2012/0242719 A1* | 9/2012 | Klompenhouwer et al. | 345/690 |
| 2012/0325536 A1* | 12/2012 | Negoro | 174/260 |

FOREIGN PATENT DOCUMENTS

| | | |
|---|---|---|
| CN | 102194391 A | 9/2011 |
| EP | 1 427 223 A2 | 6/2004 |
| EP | 1560059 A1 | 8/2005 |
| EP | 2 065 878 A1 | 6/2009 |
| JP | 2004-280052 A | 10/2004 |
| JP | 2007-017822 A | 1/2007 |
| JP | 2007-17822 A | 1/2007 |
| JP | 2008-070763 A | 3/2008 |
| JP | 2008-233180 A | 10/2008 |
| JP | 2009-98311 A | 5/2009 |
| JP | 2009-103865 A | 5/2009 |
| JP | 2009-118463 A | 5/2009 |
| JP | 2009-250994 | 10/2009 |
| JP | 2009-258584 A | 11/2009 |
| JP | 2010-276764 A | 12/2010 |
| WO | WO 2004/011987 A1 | 2/2004 |
| WO | 2007/034618 A1 | 3/2007 |

OTHER PUBLICATIONS

Office Action issued May 2, 2014 in German Patent Application No. 10 2012 221 784.3 (with English language translation).

Wikipedia article: "Thin-film-transistor liquid-crystal display", Version of Nov. 8, 2011, found in the Internet on Apr. 24, 2014, under http://en.wikipedia.org/w/index.php?title=Thin-film-transistor_liquid-crystal_display&oldid=464670397, 8 Pages.

Office Action and Search Report issued on Dec. 16, 2014 in the corresponding Chinese Patent Application No. 201210339347.X (with English Translation).

Office Action issued Sep. 15, 2015 in Chinese Patent Application No. 2011-273175 (with English language translation).

Office Action issued Sep. 15, 2015 in Japanese Patent Application No. 2011-273175 (with English language translation).

Office Action issued Sep. 6, 2015 in Chinese Patent Application No. 201210339347.X (with English language translation).

* cited by examiner

F I G. 2
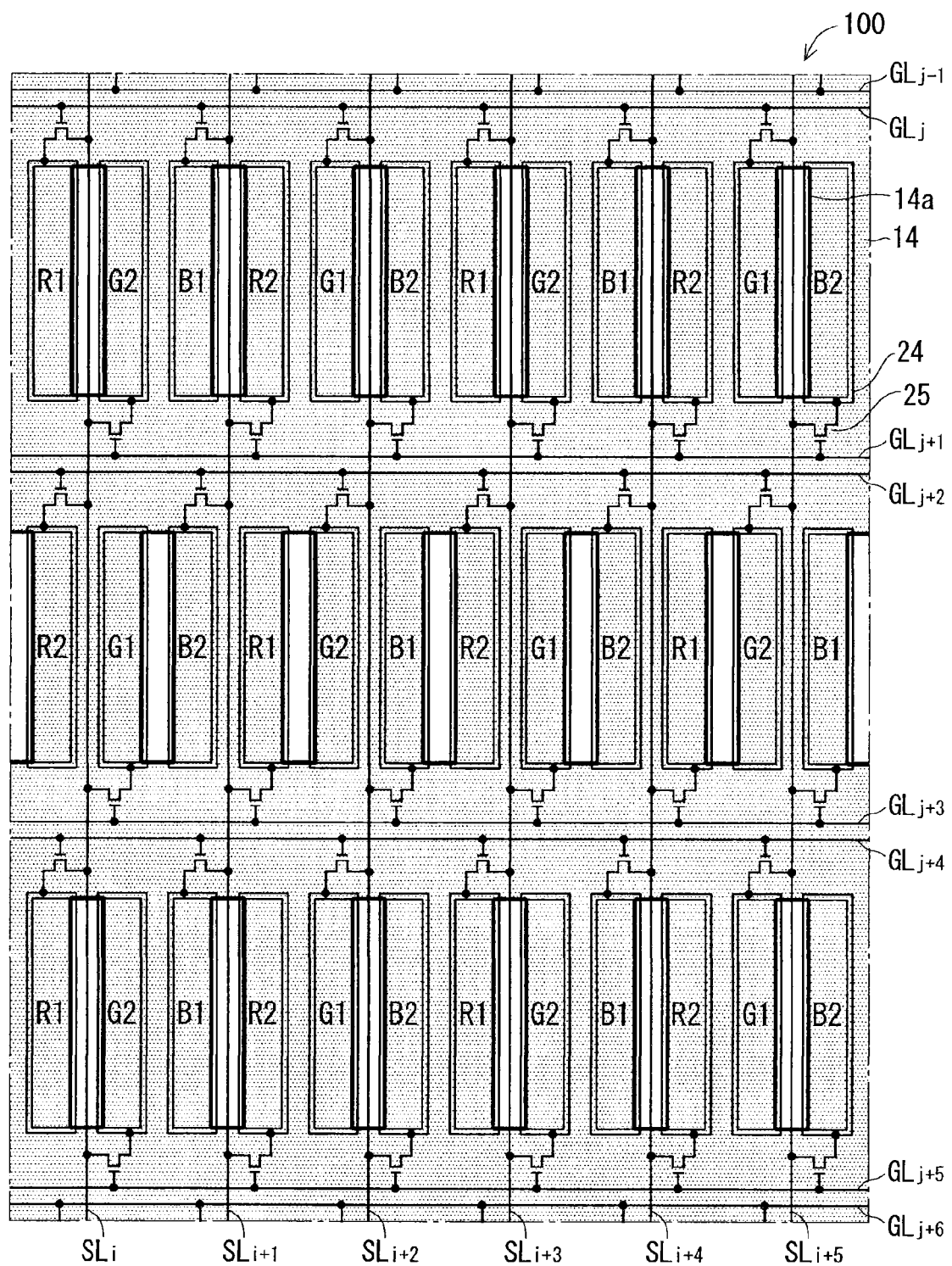

F I G. 4
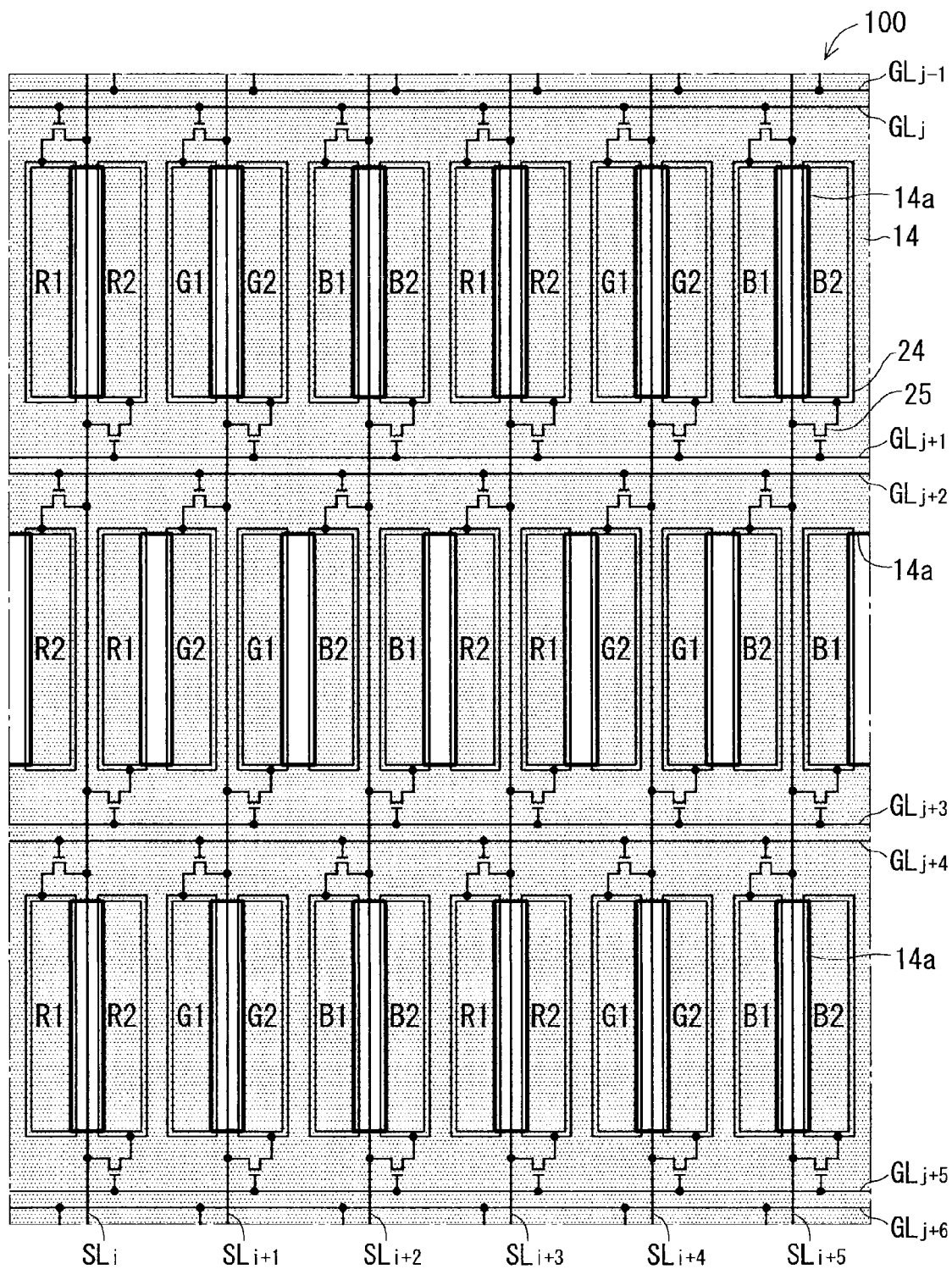

F I G . 7
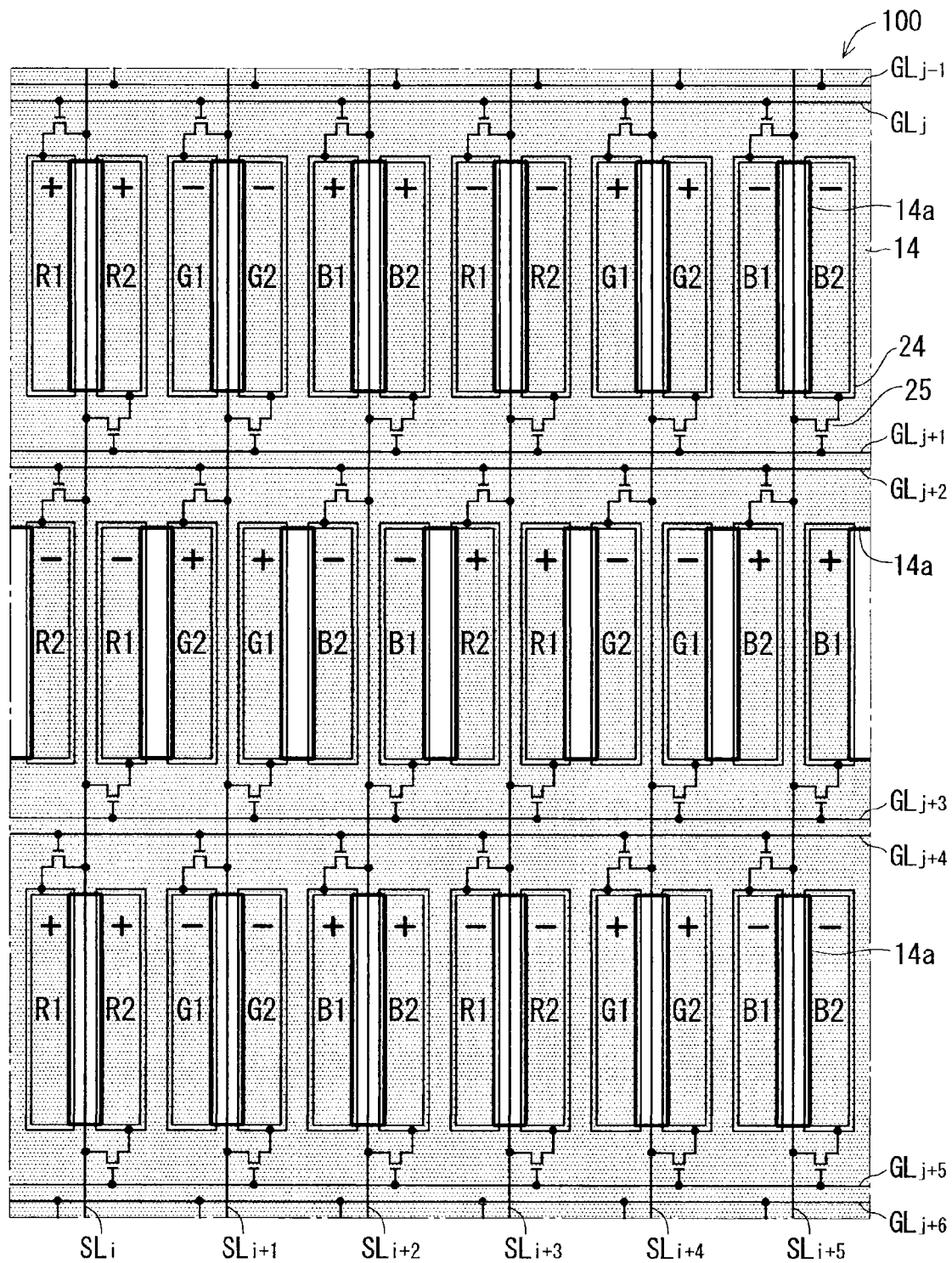

F I G. 9
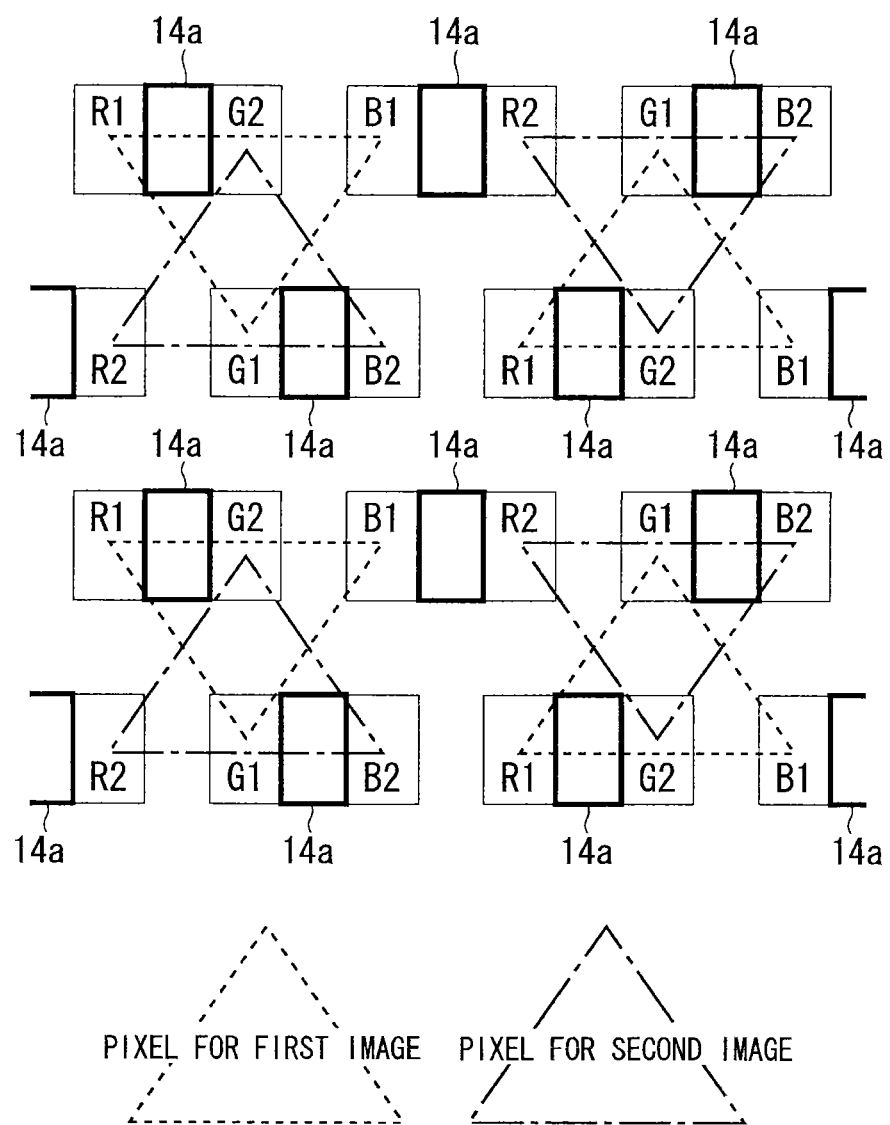

TWO-SCREEN DISPLAY DEVICE

BACKGROUND OF THE INVENTION

1. Field of the Invention

The present invention relates to a two-screen display device that displays two images in different directions.

2. Description of the Background Art

Recently, a Liquid Crystal Display (LCD) that can display a different image according to a viewing angle is becoming popular (for example, see "Dual-view liquid crystal and Triple-view liquid crystal," Sharp Technical Journal, No. 96, November, 2007). Particularly, a two-screen display device that displays two images in different directions is applied to not only a dual-view display device that enables plural viewers to simultaneously view different images, but also a 3D display device that enables stereo display such that two images are viewed by eyes of the same viewer in consideration of a parallax (for example, see Japanese Patent Application Laid-Open No. 2009-250994 and International Patent Publication No. 2004/011987).

As used herein, the "two-screen display device" should include not only the dual-view display device but also the 3D display device. Hereinafter, a color pixel including red (R), green (G), and blue (B) dots is simply referred to as a "pixel", and a monochrome pixel corresponding to each dot is referred to as a "sub-pixel."

There is well known a two-screen display method in which a parallax barrier is used. In the parallax-barrier-method two-screen display device, a sub-pixel (first sub-pixel) that displays a first image in a display region of a display panel and a sub-pixel (second sub-pixel) that displays a second image are regularly (for example, alternately) arranged, and a light shielding film, what is called a "parallax barrier," which includes plural openings is provided on (front-surface side) the display region. The opening of parallax barrier is disposed between the first sub-pixel and the second sub-pixel, and a given distance is provided between the parallax barrier and each sub-pixel.

For example, when the first sub-pixel is located on the lower left of the opening of the parallax barrier while the second sub-pixel is located on the lower right of the parallax barrier, the first sub-pixel is viewed through the opening of the parallax barrier from the right side toward the front of the display panel, and the second sub-pixel is viewed through the opening of the parallax barrier from the left side toward the front of the display panel. Accordingly, the first image displayed by the first sub-pixel is viewed from the right side toward the front of the display panel, and the second image displayed by the second sub-pixel is viewed from the left side toward the front of the display panel.

The dual-view display device has a configuration in which the first image and the second image are not viewed at the same time from the same viewer by increasing a difference between a range (angle) where the first image is viewed and a range where the second image is viewed. On the other hand, the 3D display device has a configuration in which the first image and the second image can simultaneously be viewed with eyes of the same viewer by decreasing the difference between the range where the first image is viewed and the range where the second image is viewed. That is, the dual-view display device and the 3D display device have the same basic structure. The range (angle) where each image is viewed is defined by a size of the opening of the parallax barrier or the distance between the parallax barrier and the pixel.

As can be seen from the above description, in the parallax-barrier-method two-screen display device, a half of the plural sub-pixels disposed in the display region is used to display the first image, and other half is used to display the second image. Accordingly, resolution of the first image and resolution of the second image displayed by the two-screen display device become substantially a half of the resolution possessed by the display device, which results in degradation of image quality.

In the parallax-barrier-method two-screen display device, the first sub-pixel and the second sub-pixel are horizontally arrayed with the opening of the parallax barrier interposed therebetween. Therefore, when the sub-pixels are simply arrayed without changing the size of each sub-pixel or changing a horizontally in-line array of the red (R), green (G), and blue (B) sub-pixels constituting one pixel (color pixel), compared with a usual display device that displays only one screen (hereinafter, referred to as "one-screen display device"), the vertical resolution is identical but the horizontal resolution is a half.

In order that the resolution of the first image and the resolution of the second image are increased while the size of the display region is kept constant, the size of each sub-pixel is reduced to narrow a pitch of the sub-pixel, and the number of pixels arrayed in the display region is increased. For example, when the number of pixels is increased in the liquid crystal display device, it is necessary to increase the number of source lines that supply image signals to the pixels or the number of gate lines that drive the pixels according to increasing number of pixels. Therefore, a production cost increase is generated in order to increase the resolution of the display device.

When the pitch of the sub-pixel is narrowed in the two-screen display device, the range (angle) where the first image and second image are viewed is narrowed. In order that the resolution is increased while the range where the first image and second image are viewed is kept constant, it is necessary to narrow the distance between the parallax barrier and the pixel. For example, in the liquid crystal display device, when the distance between the parallax barrier and the pixel is defined by a thickness of a substrate (color filter substrate) on which a color filter or a black matrix is mounted, it is necessary to thin the substrate, and possibly a production process of the display device of the background art is hardly applied, which results in the production cost increase.

SUMMARY OF THE INVENTION

It is an object of the present invention to provide a two-screen display device, in which an increase of production cost can be suppressed while the same resolution as an image of a one-screen display device is maintained.

A two-screen display device according to a first aspect of the present invention includes, a first sub-pixel that is of a sub-pixel for a first image and a second sub-pixel that is of a sub-pixel for a second image, the first sub-pixel and the second sub-pixel being adjacent to each other, each of the first sub-pixel and the second sub-pixel having an aspect ratio of about 6:1, and a source line that supplies an image signal to both the first sub-pixel and the second sub-pixel. The two-screen display device also includes, a first switching element that is connected between the source line and the first sub-pixel, a second switching element that is connected between the source line and the second sub-pixel, a first gate line that is of a gate line supplying a driving signal to a control electrode of the first switching element to drive the first sub-pixel, and a second gate line that is of a gate line supplying a driving signal to a control electrode of the second switching element to drive the second sub-pixel. A parallax barrier that is of a light shielding film is provided on the display region in which a plurality of sets of the first sub-pixels and the second sub-pixels are arrayed into the two-dimensional matrix shape, the parallax barrier including a plurality of openings arrayed in a region between the first sub-pixel and the second sub-pixel, which are adjacent to each other.

The horizontal width of the sub-pixel is narrow, and the horizontal pitch of the sub-pixel is a half of the background art, so that the first image and the second image can be displayed with the same resolution as the one-screen display device. Because the number of source lines is equal to that of the background art, the increase of the production cost is suppressed.

A two-screen display device according to a second aspect of the present invention includes, a first sub-pixel that is of a sub-pixel for a first image and a second sub-pixel that is of a sub-pixel for a second image, the first sub-pixel and the second sub-pixel being adjacent to each other, each of the first sub-pixel and the second sub-pixel having an aspect ratio of about 3:2, and a first source line that is of a source line supplying an image signal to the first sub-pixel, a second source line that is of a source line supplying an image signal to the second sub-pixel. The two-screen display device also includes, a first switching element that is connected between the first source line and the first sub-pixel, a second switching element that is connected between the second source line and the second sub-pixel, and a gate line that supplies a driving signal to control electrodes of the first switching element and the second switching element to drive the first sub-pixel and the second sub-pixel. A parallax barrier that is of a light shielding film is provided on the display region in which a plurality of sets of the first sub-pixels and the second sub-pixels are arrayed into the two-dimensional matrix shape, the parallax barrier including a plurality of openings arrayed in a region between the first sub-pixel and the second sub-pixel, which are adjacent to each other.

Although the vertical length of the sub-pixel is short, the horizontal width of the pixel is a half (three sub-pixel columns) of that of the background art by forming one pixel (color pixel) column using two sub-pixel rows, and the horizontal pitch of the pixel is a half of that of the background art. Therefore, the first image and the second image can be displayed with the same resolution as the one-screen display device. Because the width of the sub-pixel is equal to that of the background art, the distance between the pixel and the parallax barrier may be equal to that of the background art. Therefore, the production process for the display device of the background art can easily be applied to suppress the increase of the production cost.

A two-screen display device according to a third aspect of the present invention includes, a first sub-pixel that is of a sub-pixel for a first image and a second sub-pixel that is of a sub-pixel for a second image, the first sub-pixel and the second sub-pixel being adjacent to each other, each of the first sub-pixel and the second sub-pixel having an aspect ratio of about 3:2, and a source line that supplies an image signal to both the first sub-pixel and the second sub-pixel. The two-screen display device also includes, a first switching element that is connected between the source line and the first sub-pixel, a second switching element that is connected between the source line and the second sub-pixel, a first gate line that is of a gate line supplying a driving signal to a control electrode of the first switching element to drive the first sub-pixel, and a second gate line that is of a gate line supplying a driving signal to a control electrode of the second switching element to drive the second sub-pixel. A parallax barrier that is of a light shielding film is provided on the display region in which a plurality of sets of the first sub-pixels and the second sub-pixels are arrayed into the two-dimensional matrix shape, the parallax barrier including a plurality of openings arrayed in a region between the first sub-pixel and the second sub-pixel, which are adjacent to each other.

Although the vertical length of the sub-pixel is short, the horizontal width of the pixel is a half (three sub-pixel columns) of that of the background art by forming one pixel (color pixel) column using two sub-pixel rows, and the horizontal pitch of the pixel is a half of that of the background art. The number of source lines is a half of that of the background art because of the configuration in which the image signal is supplied to the two sub-pixel columns from the one source line. Because the width of the sub-pixel is equal to that of the background art, the distance between the pixel and the parallax barrier may be equal to that of the background art. Therefore, the production process for the display device of the background art can easily be applied to suppress the increase of the production cost.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a plan view illustrating a liquid crystal display panel of the two-screen display device of the first embodiment;

FIG. 4 is a plan view illustrating a liquid crystal display panel of the two-screen display device of the second embodiment;

FIG. 7 is a plan view illustrating the liquid crystal display panel of the two-screen display device of the fourth embodiment;

FIG. 9 is a view illustrating a method (1×2 driving method) for driving the two-screen display device of the fifth embodiment;

DESCRIPTION OF THE PREFERRED EMBODIMENTS

First Embodiment

Figure 1:
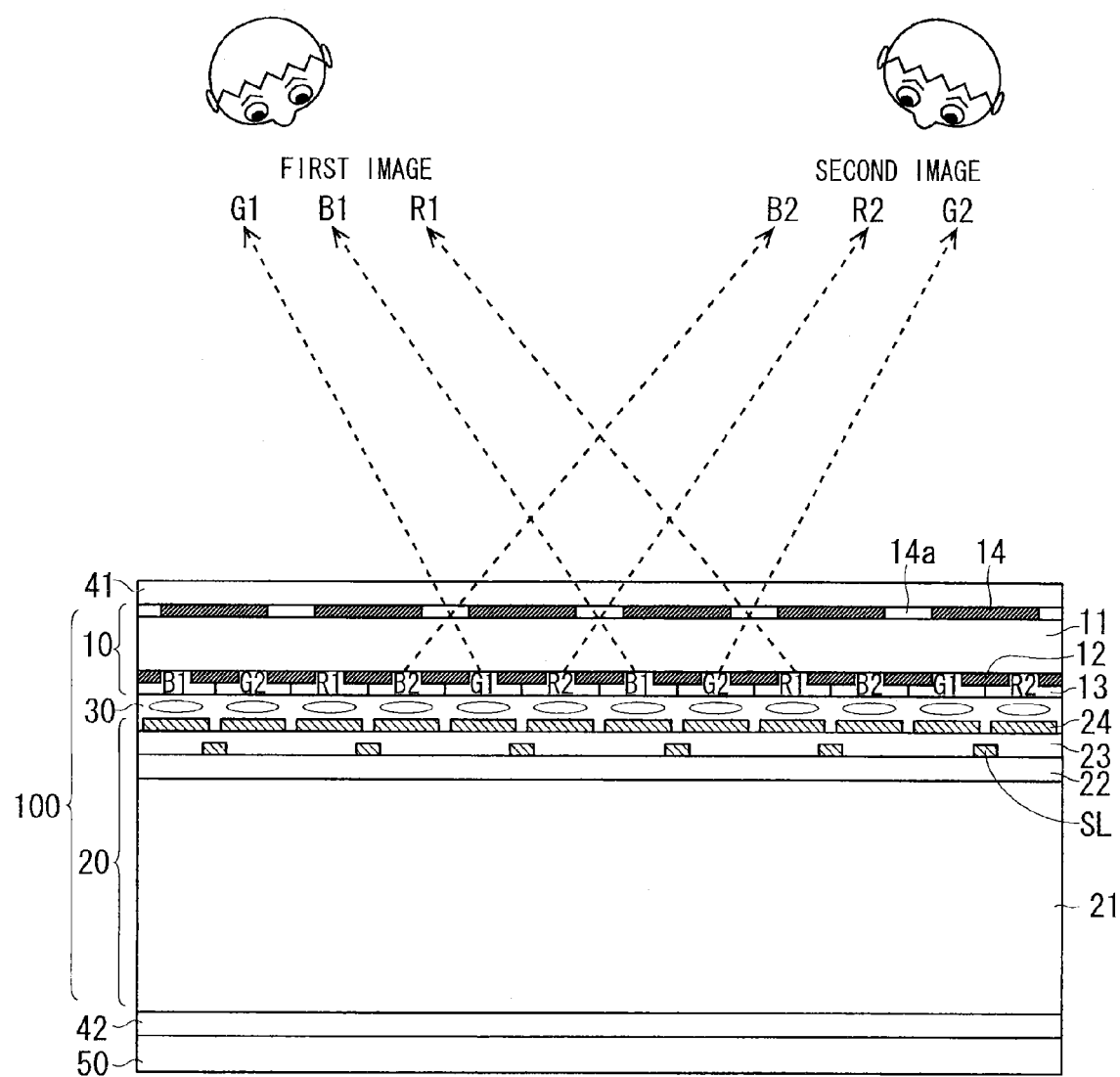
FIG. 1 is a sectional view illustrating a two-screen display device according to a first embodiment.

FIGS. 1 and 2 are views illustrating a configuration of a liquid crystal display device that is of a two-screen display device according to a first embodiment of the present invention. FIG. 1 is a sectional view of the two-screen display device, and FIG. 2 is a plan view of a liquid crystal display panel 100. At this point, a dual view liquid crystal display device that enables plural viewers to simultaneously view different images is displayed as an example of the two-screen display device.

As illustrated in FIG. 1, in the two-screen display device of the first embodiment, a liquid crystal display panel 100 and polarizers 41 and 42 that are provided on a front-surface side (visible side) and a rear-surface side are disposed on the front-surface side of the backlight unit 50. The liquid crystal display panel 100 is configured such that a liquid crystal 30 is interposed between a color filter substrate 10 on the front-surface side and a TFT array substrate 20 on the rear-surface side.

The color filter substrate 10 includes a transparent first substrate 11, such as a glass substrate, a black matrix 12 and a color filter 13, which are formed in a surface (surface opposite the TFT array substrate 20) on the rear-surface side of the first substrate 11, and a parallax barrier 14 that is formed in a surface on the front-surface side of the first substrate 11. The black matrix 12 is a light shielding film that shields light between sub-pixels, and the black matrix 12 includes openings each of which defines a region of the sub-pixel. The color filter 13 is a color material that is one of red (R), green (G), and blue (B), and defines a color of the light (the light passing through the opening of the black matrix 12) emitted from each sub-pixel. The parallax barrier 14 is a light shielding film that allows passage of the light passing through the opening of the black matrix 12 only in a specific direction, and the parallax barrier 14 is made of metal or black resin.

On the other hand, the TFT array substrate 20 includes a transparent second substrate 21, such as a glass substrate, a pixel electrode 24 of each sub-pixel, a Thin Film Transistor (TFT) 25 that supplies an image signal to each pixel electrode 24, a gate line (scanning signal line) GL that supplies a driving signal to a gate electrode of each TFT 25, and a source line (image signal line) SL that supplies an image signal to a source electrode of each TFT 25.

The gate line GL and the gate electrodes of the TFT 25 are formed in an upper surface of the second substrate 21 (not illustrated in FIG. 1). The gate line GL and the gate electrode of the TFT 25 are covered with a gate insulator 22, and the source line SL and the source electrode and drain electrode of the TFT 25 are formed on the gate insulator 22. The source line SL and the TFT 25 are covered with an interlayer insulator 23, and the pixel electrode 24 is formed on the interlayer insulator 23. The pixel electrode 24 is connected to the drain electrode of the TFT 25 through a contact hole made in the interlayer insulator 23.

A configuration and a function of the parallax barrier 14 will specifically be described. The parallax barrier 14 includes a slit-like opening 14a that is deviated from the opening of the black matrix 12 when viewed from above. A predetermined distance (in the first embodiment, corresponding to a thickness of the first substrate 11) is provided between the parallax barrier 14 and the black matrix 12. In the configuration, the light output from the opening (sub-pixel) of the black matrix 12 to a direction of the front of the liquid crystal display panel is shielded by the parallax barrier 14, and only the light output in an oblique direction passes through the opening 14a of the parallax barrier 14.

In the two-screen display device, each two openings (sub-pixels) of the black matrix 12 are allocated to one opening 14a of the parallax barrier 14. As illustrated in FIG. 2, when the liquid crystal display panel 100 is viewed from the front, a first sub-pixel (one of a red first sub-pixel R1, a green first sub-pixel G1, and a blue first sub-pixel B1) is disposed on the left of each opening 14a in order to display a first image, and a second sub-pixel (one of a red second sub-pixel R2, a green second sub-pixel G2, and a blue second sub-pixel B2) is disposed on the right of each opening 14a in order to display a second image.

As a result, as illustrated in FIG. 1, the first image displayed by the first sub-pixels R1, G1, and B1 can be viewed through the opening 14a of the parallax barrier 14 from the right side toward the front of the liquid crystal display panel 100, and the second image displayed by the second sub-pixels R2, G2, and B2 can be viewed from the left side toward the front of the liquid crystal display panel 100.

In the first embodiment, as illustrated in FIG. 1, the first substrate 11 acts as a gap layer that defines a distance between the parallax barrier 14 and the black matrix 12 by a thickness thereof, because the parallax barrier 14 and the black matrix 12 are disposed on the surfaces, which are opposite to each other with respect to the first substrate 11. Usually a difference between a range where the first image is viewed (an angle with respect to the front direction of the liquid crystal display panel 100) and a range where the second image is viewed is increased with decreasing thickness of the gap layer, and the difference is decreased with increasing thickness of the gap layer. Therefore, the thin gap layer is used in the dual-view display device that displays the different images for the different viewers, and the thick gap layer is used in the 3D display device in which the different images are visible by eyes of one viewer.

The detailed configuration of the liquid crystal display panel 100 of the two-screen display device of the first embodiment will be described below. In a display region of the liquid crystal display panel 100, as illustrated in FIG. 2, the first sub-pixels (one of the red first sub-pixel R1, the green first sub-pixel G1, and the blue first sub-pixel B1) and the second sub-pixels (one of the red second sub-pixel R2, the green second sub-pixel G2, and the blue second sub-pixel B2) are alternately disposed in a horizontal direction (the direction in which the gate line GL extends).

One pixel (color pixel) includes red, blue, and green sub-pixels arrayed in the horizontal direction. Therefore, in the one-screen display device, an aspect ratio of each sub-pixel is set to about 3:1.

On the other hand, in the two-screen display device of the background art, the aspect ratio of each sub-pixel is about 3:1 similarly to one-screen display device, because of a configuration in which the parallax barrier is disposed on the display panel having the same structure as the one-screen display device. A half of the sub-pixels is used as the first sub-pixel that displays the first image, and a half of the sub-pixels is used as the second sub-pixel that displays the second image. Accordingly, in the two-screen display device of the background art, resolution in the horizontal direction of the first image and second image is a half of the display image of the one-screen display device.

On the other hand, in the liquid crystal display panel 100 of the two-screen display device of the first embodiment, horizontal widths of the first sub-pixel and second sub-pixel are set to a half of those of the one-screen display device, and the first sub-pixel and the second sub-pixel are horizontally disposed with a half pitch of the two-screen display device of the background art. The aspect ratios of the first sub-pixel and second sub-pixel are about 6:1, and the number of sub-pixels arrayed in the horizontal direction is double that of the two-screen display device of the background art. Accordingly, the horizontal resolution of the liquid crystal display panel 100 is double the resolution of the two-screen display device of the background art, namely, the same resolution as the one-screen display device.

Plural sets of the first sub-pixels and the second sub-pixels, in each of which the first sub-pixel and the second sub-pixel are horizontally adjacent to each other, are arrayed into the two-dimensional matrix shape in the display region of the liquid crystal display panel 100. Hereinafter, the horizontal array of the sub-pixels is referred to as a "row," and the vertical array of the sub-pixels is referred to as a "column". In the following description, the aspect ratio of each sub-pixel does not mean an aspect ratio of the opening portion of the black matrix 12 that defines a region of each sub-pixel, but an aspect ratio of a repetition unit of the sub-pixels arrayed in the row direction and the column direction, and the aspect ratio of each sub-pixel corresponds to a ratio of pitches in the vertical direction and the horizontal direction of the arrayed sub-pixels.

In the first embodiment, as illustrated in FIG. 2, the first sub-pixels and the second sub-pixels are alternately disposed in the vertical direction (the direction in which the source line SL extends). That is, a positional relationship between the first sub-pixel and the second sub-pixel inverts in the sub-pixel rows adjacent to each other. Accordingly, in the display region of the liquid crystal display panel 100 of the first embodiment, the first sub-pixels and the second sub-pixels are alternately arrayed in both the vertical direction and the horizontal direction. In other words, the first sub-pixels and the second sub-pixels are disposed in a zigzag manner.

In each opening 14a of the parallax barrier 14, it is necessary that the first sub-pixel be disposed on the left of the each opening 14a while the second sub-pixel is disposed on the right. Therefore, as illustrated in FIG. 2, the openings 14a are also disposed in the zigzag manner.

Each of the first sub-pixel and the second sub-pixel produces one of the red, green, and blue colors. In the first embodiment, the first sub-pixels and the second sub-pixels are arrayed such that the color produced by each of the first sub-pixel and the second sub-pixel changes regularly in each sub-pixel in the horizontal direction. In the example in FIG. 2, the red first sub-pixel R1, the green second sub-pixel G2, the blue first sub-pixel B1, the red second sub-pixel R2, the green first sub-pixel G1, the blue second sub-pixel B2, the red first sub-pixel R1, . . . are periodically arrayed.

When the front of liquid crystal display panel 100 is viewed from the right, because the second sub-pixel is shielded by the parallax barrier 14, the red first sub-pixel R1, the blue first sub-pixel B1, and the green first sub-pixel G1 are viewed while horizontally arrayed, and one pixel (color pixel) is constructed by the three sub-pixels. As a result, the first image is viewed from the right toward the front of the liquid crystal display panel 100.

On the other hand, when the front of liquid crystal display panel 100 is viewed from the left, because the first sub-pixel is shielded by the parallax barrier 14, the green second sub-pixel G2, the red second sub-pixel R2, and the blue second sub-pixel B2 are viewed while horizontally arrayed, and one pixel is constructed by the three sub-pixels. As a result, the second image is viewed from the left toward the front of the liquid crystal display panel 100.

In the liquid crystal display panel 100 of the two-screen display device of the first embodiment, six sub-pixels horizontally arrayed in line, namely, the red first sub-pixel R1, the blue first sub-pixel B1, the green first sub-pixel G1, the green second sub-pixel G2, the red second sub-pixel R2, and the blue second sub-pixel B2 constitute a basic unit (six sub-pixels including the red, green, and blue color pixels that displays each of the first image and the second image) corresponding to one pixel including the first image observed from the right toward the front of the liquid crystal display panel 100 and the second image observed from the left. In the first image and the second image and the combination array of red, green, and blue of the six sub-pixels constituting the basic unit, the sub-pixels corresponding to the first image and the second image replace each other in each row, and the two kinds of the arrays are alternately repeated. The horizontal resolution and the vertical resolution are determined by the numbers of basic units arrayed in the row direction and column direction, respectively. The liquid crystal display panel 100 of the two-screen display device of the first embodiment can also act as the one-screen display device by displaying the common image for the first image and the second image. In this case, the basic unit including the six sub-pixels corresponds to one pixel (color pixel) in the one-screen display device.

As illustrated in FIG. 2, the source line SL extends in the vertical direction, and is disposed between the first sub-pixel and the second sub-pixel, which are horizontally adjacent to each other. Each source line SL is configured to supply the image signal to both the first sub-pixel and the second sub-pixel, which are adjacent to each other with the source line SL interposed therebetween. Accordingly, both the TFT 25 connected to the first sub-pixel and the TFT 25 connected to the adjacent second sub-pixel are connected to the source line SL.

Therefore, the number of source lines SL is a half of the number of sub-pixel columns, and the source line SL is disposed in each two sub-pixel columns as illustrated in FIG. 2. In the two-screen display device of the first embodiment, the number of source lines SL is equal to that of the two-screen display device of the background art while the horizontal resolution (the number of sub-pixel columns) is double that of the two-screen display of the background art.

The source line SL is disposed between the first sub-pixel and the second sub-pixel in each two sub-pixel columns, and the openings 14a are arrayed in the zigzag manner. Therefore, as illustrated in FIG. 2, the row in which the opening 14a is provided on the source line SL and the row in which the opening 14a is not provided are alternately arrayed in the display region. In a certain sub-pixel row, the opening 14a is provided in the region between the first sub-pixel and the second sub-pixel, which receive the image signal from the same source line SL. In the adjacent row, the opening 14a is provided in the region between the first sub-pixel and the second sub-pixel, which receive the image signal from the different source lines SL.

The gate line GL supplies the driving signal to the gate electrode of the TFT 25, thereby driving each sub-pixel. Each gate line GL extends in the horizontal direction (that is, the direction intersecting the gate line GL), and is disposed between the sub-pixel rows. In the first embodiment, each sub-pixel row is driven by the gate line GL (first gate line) that drives the first sub-pixel and the gate line GL (second gate line) that drives the second sub-pixel. Referring to FIG. 2, the odd-numbered gate line GL is connected to the gate electrode of the TFT 25 which is connected to the sub-pixel arranged on the left side of each source line SL, and the even-numbered gate line GL is connected to the gate electrode of the TFT 25 which is connected to the sub-pixel arranged on the right side of each source line SL (in FIG. 2, j is an odd number). That is, two gate lines GL are provided in each sub-pixel row. Therefore, the number of gate lines GL is double that of the two-screen display device of the background art.

As illustrated in FIG. 2, each sub-pixel row is disposed between the gate line GL that drives the first sub-pixel belonging to the sub-pixel row and the gate line GL that drives the second sub-pixel. In other words, two gate lines GL that drive one sub-pixel row are disposed such that the sub-pixel row is interposed therebetween. Therefore, the two gate lines GL are provided between the sub-pixel rows.

In the two-screen display device of the first embodiment, the horizontal width of each sub-pixel is a half of that of the two-screen display device of the background art, the aspect ratio is set to about 6:1, and the number of sub-pixels horizontally disposed is double that of the two-screen display device of the background art. Therefore, while a size of the display region is maintained, the horizontal resolution is double that of the two-screen display device of the background art, namely, equal to that of the one-screen display device.

The first image and the second image can be displayed with the same resolution as the one-screen display device. For example, in the two-screen display device of the background art, the image displayed by VGA (640×480) on the one-screen display device is displayed by ½VGA (320×480). On the other hand, in the two-screen display device of the first embodiment, the image displayed by VGA (640×480) on the one-screen display device can directly be displayed as the VGA image.

In the liquid crystal display panel 100 of the two-screen display device of the first embodiment, because the six sub-pixels corresponding to the red, green, and blue sub-pixels observed on the right and left is constructed by the six sub-pixels that are horizontally arrayed in line, the aspect ratio of each sub-pixel is set to about 6:1, whereby the one pixel constructed by the red, green, and blue sub-pixels is formed into a substantially square shape in which the aspect ratio is about 1:1. In other words, a ratio of pitches of the horizontally- and vertically-arrayed pixels including the red, green and blue sub-pixels is about 1:1. Accordingly, image information, which is generally produced on the assumption that an image is displayed on a display device including the pixels each of which is formed into the substantially square shape having the aspect ratio of about 1:1, can be displayed as the image having the assumed aspect ratio. For a use application in which a slight deformation is allowed with respect to the aspect ratio of the displayed visual information, it is not always necessary to set the aspect ratio of each sub-pixel to about 6:1.

Because of the configuration in which the image signal is supplied from the one source line SL to the two sub-pixel columns, the number of source lines SL is kept same as the background art even if the horizontal resolution is double that of the two-screen display device of the background art. Therefore, the number of image-signal output circuits (ICs) may be equal to that of the two-screen display device of the background art.

On the other hand, because the first sub-pixel and the second sub-pixel are driven using the separate gate lines GL in each sub-pixel row, the number of gate lines GL is double that of the two-screen display device of the background art. In the display device in which each pixel is constructed by the red, green and blue sub-pixels, each pixel is driven using one gate wiring and three source wirings. In the case in which the horizontal resolution is doubled, like the first embodiment, the number of gate wirings is doubled while the number of source wirings is kept constant rather than the number of source wirings is doubled while the number of gate wirings is kept constant, which allows the number of necessary wirings to be reduced to produce the liquid crystal display panel 100 at relatively low cost.

Second Embodiment

Figure 3:
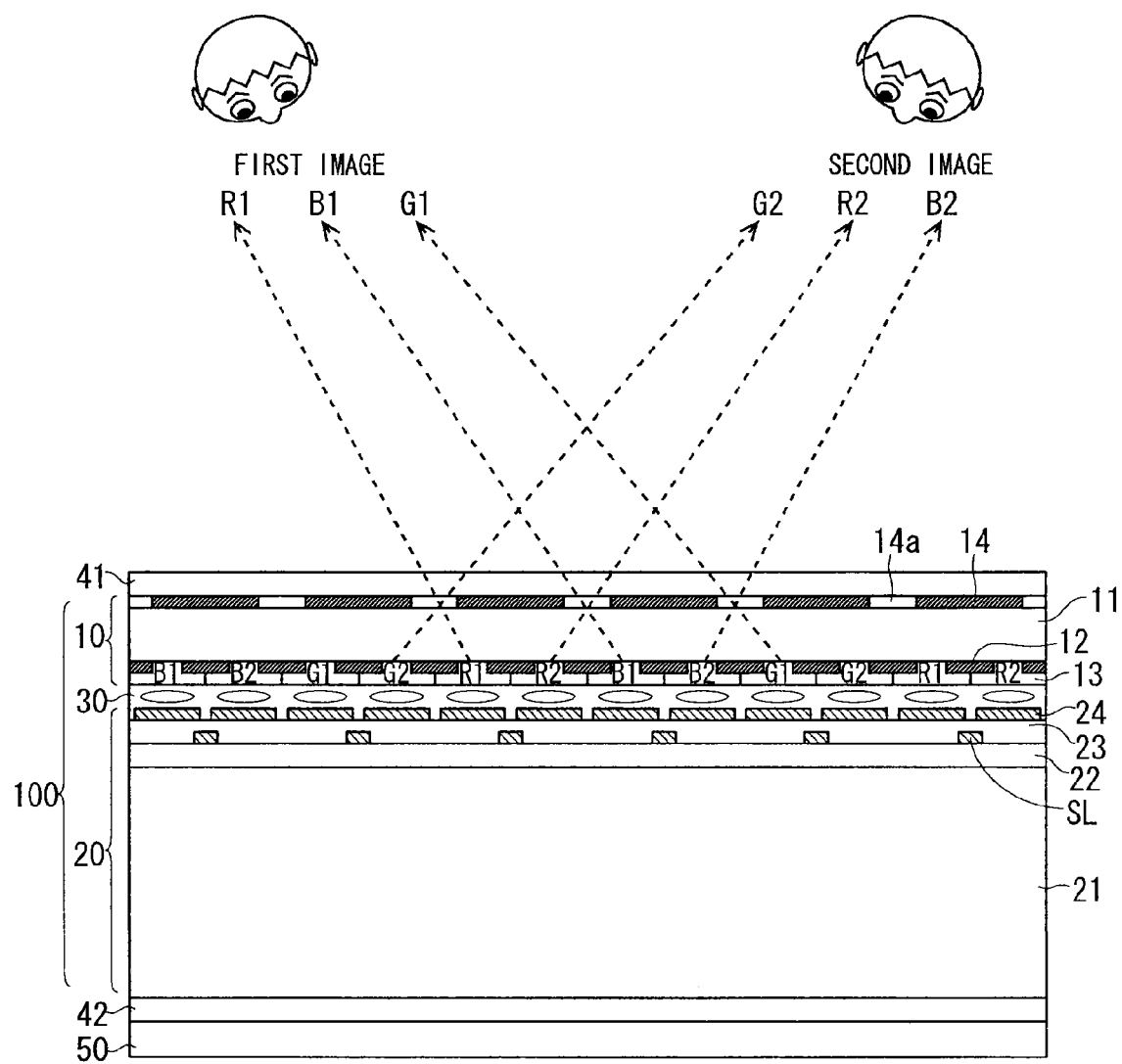
FIG. 3 is a sectional view illustrating a two-screen display device according to a second embodiment.

FIGS. 3 and 4 are views illustrating a configuration of a liquid crystal display device that is of a two-screen display device according to a second embodiment of the present invention. FIG. 3 is a sectional view of the two-screen display device, and FIG. 4 is a plan view of the liquid crystal display panel 100.

In the first embodiment, the first sub-pixels and the second sub-pixels are arrayed such that the color produced by each of the first sub-pixel and the second sub-pixel changes horizontally in each one sub-pixel. On the other hand, in the second embodiment, the first sub-pixels and the second sub-pixels are arrayed such that the color produced by each of the first sub-pixel and the second sub-pixel changes regularly in each two sub-pixels. Specifically, the first sub-pixel and the second sub-pixel, which receive the image signal from the same source line SL, are formed in the same color. Other configurations of the second embodiment are identical to those of the first embodiment.

In the example in FIG. 4, the red first sub-pixel R1, the red second sub-pixel R2, the green first sub-pixel G1, the green second sub-pixel G2, the blue first sub-pixel B1, the blue second sub-pixel B2, the red first sub-pixel R1, . . . are periodically arrayed in each row.

As illustrated in FIG. 3, when the front of the liquid crystal display panel 100 is viewed from the right, because the second sub-pixel is shielded by the parallax barrier 14, the red first sub-pixel R1, the blue first sub-pixel B1, and the green first sub-pixel G1 are viewed while horizontally arrayed, and one pixel (color pixel) is constructed by the three sub-pixels. Therefore, in this case, the first image is viewed from the right toward the front of the liquid crystal display panel 100.

When the front of the liquid crystal display panel 100 is viewed from the left, because the first sub-pixel is shielded by the parallax barrier 14, the green second sub-pixel G2, the red second sub-pixel R2, and the blue second sub-pixel B2 are viewed while horizontally arrayed, and one pixel is constructed by the three sub-pixels. Therefore, the second image is viewed from the left toward the front of the liquid crystal display panel 100.

In the second embodiment, the same effect as the first embodiment is obtained.

Third Embodiment

Figure 5:
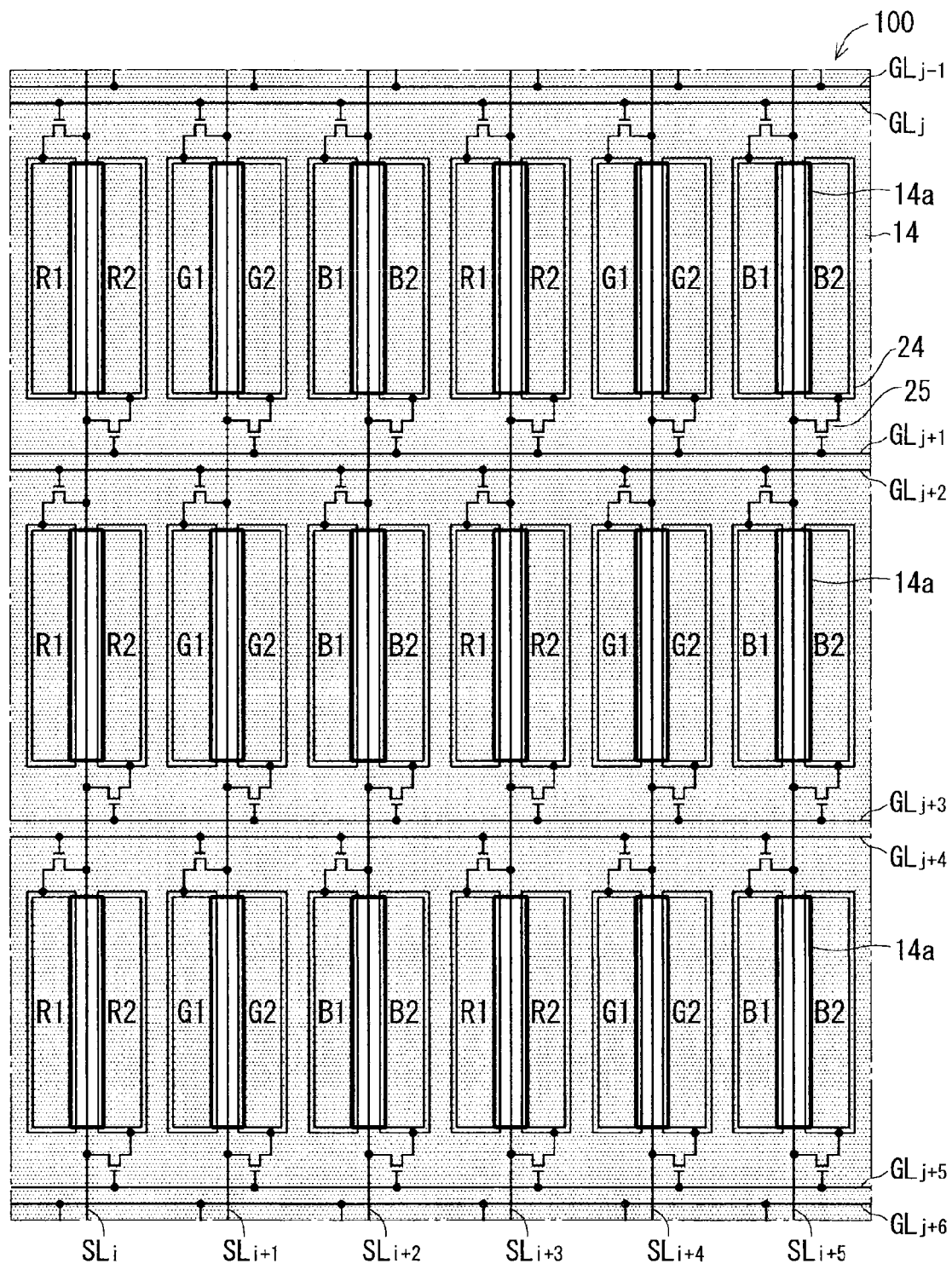
FIG. 5 is a plan view illustrating a liquid crystal display panel of a two-screen display device according to a third embodiment.

FIG. 5 is a view illustrating a configuration of a liquid crystal display device that is of a two-screen display device according to a third embodiment of the present invention and a plan view of the liquid crystal display panel 100 of the two-screen display device.

In the third embodiment, the openings 14a of the parallax barrier 14 are arrayed not into the zigzag shape, but into the two-dimensional matrix shape. Specifically, all the openings 14a in the display region are provided on the source lines SL. All the openings 14a are disposed in the region between the first sub-pixel and the second sub-pixel, which receive the image signal from the same source line SL.

Other configurations of the third embodiment are identical to those of the second embodiment. However, as a result of the array of the openings 14a into the two-dimensional matrix shape, the row including only the first sub-pixels and the row including only the second sub-pixels are alternately arrayed in the display region. The positional relationship between the first sub-pixel and the second sub-pixel is identical in each sub-pixel row.

In the third embodiment, the same effect as the first embodiment is obtained.

Fourth Embodiment

In a fourth embodiment, a driving method suitable to the two-screen display device of the present invention will be described.

A problem with the drive of the two-screen display device of the background art will be described in advance of the description of the driving method. Generally, in the liquid crystal display device, frequently a dot inversion driving method and a liquid crystal driving method derived therefrom are adopted in order to suppress generation of a flicker (flicker in image) caused by AC drive of the liquid crystal. In the dot inversion driving method, a polarity of the image signal supplied to the source line is inverted in each gate line, and the polarities of the image signals are reversed each other in the source lines adjacent to each other.

Figure 14:
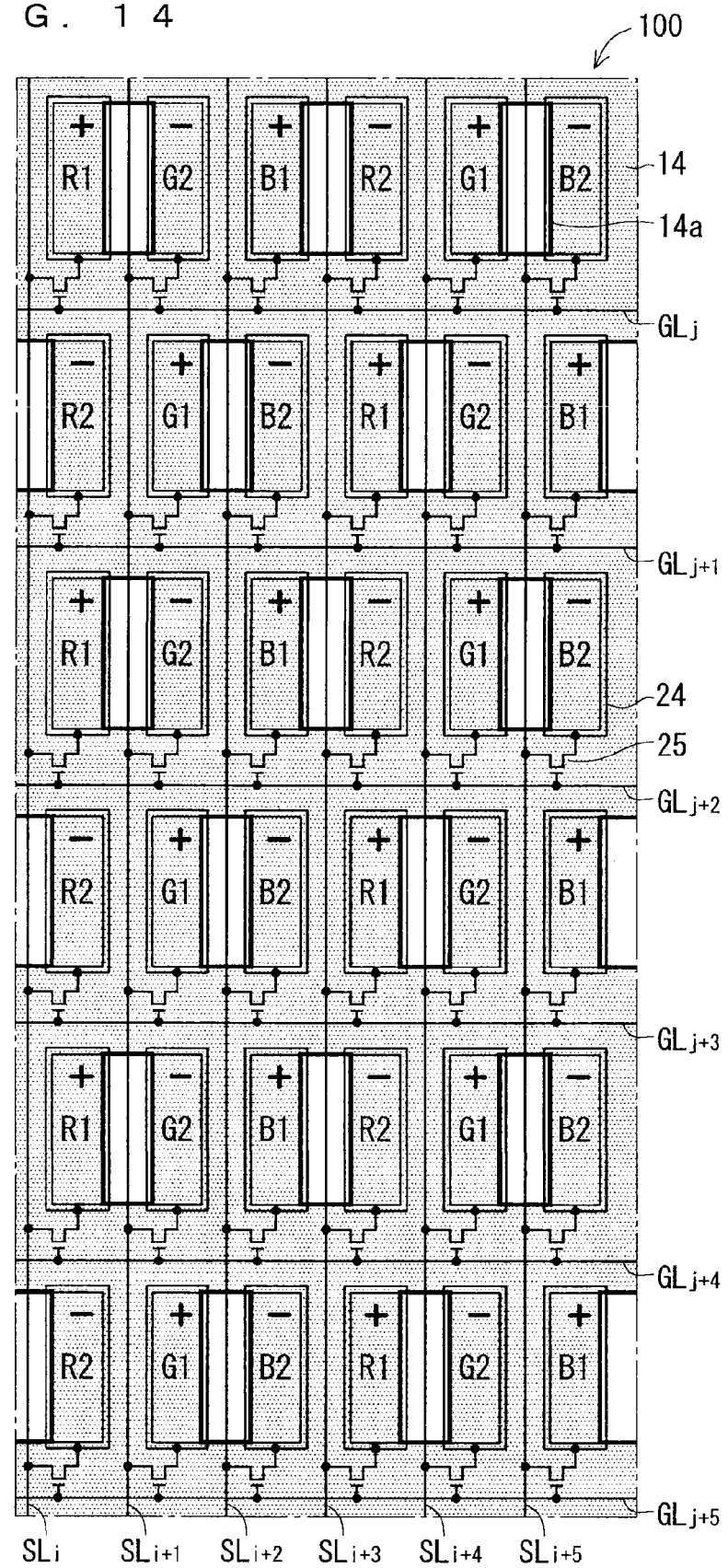
FIG. 14 is a view illustrating a polarity of each sub-pixel when a two-screen display device of the background art is driven by the dot inversion driving method.

FIG. 14 is a view illustrating the positive (+)/negative (−) polarity (hereinafter sometimes also simply referred to as a "sub-pixel polarity") of the image signal supplied to each sub-pixel when the two-screen display device of the background art is driven by the dot inversion driving method. In the two-screen display device of the background art, each sub-pixel column receives the image signal from the individual source line SL, and each sub-pixel row is driven by the individual gate line GL, whereby the polarity of the image signal is inverted in each sub-pixel in both the vertical direction (column direction) and the horizontal direction (row direction).

For example, it is assumed that, in a certain frame, the polarity of the image signal is sequentially changed into +, −, +, −, +, . . . from the sub-pixel driven by a jth gate line $GL_j$ in the sub-pixel column that receives the image signal from an ith source line $SL_i$ as illustrated in FIG. 14. In this case, in the sub-pixel column that receives the image signal from an (i+1)th source line $SL_{i+1}$, the polarity of the image signal is sequentially changed into −, +, −, +, −, . . . from the sub-pixel driven by the jth gate line $GL_j$. Similarly, the polarity of the image signal is sequentially changed into +, −, +, −, +, . . . from the gate line $GL_j$ in a source line $SL_{i+2}$, and the polarity of the image signal is sequentially changed into −, +, −, +, −, . . . from the gate line $GL_j$ in a source line $SL_{i+3}$. Because the polarity of each sub-pixel is inverted in each frame, the polarity of each sub-pixel becomes the reverse of the state in FIG. 14 in the next frame.

In the one-screen display device, the generation of the flicker is effectively suppressed by alternately setting the polarities of the sub-pixels. However, the insufficient effect is obtained in the two-screen display device of the background art in FIG. 14.

In the example in FIG. 14, all the first sub-pixels (the red first sub-pixel R1, the green first sub-pixel G1, and the blue first sub-pixel B1) have the positive polarity (+), and all the second sub-pixels (the red second sub-pixel R2, the green second sub-pixel G2, and the blue second sub-pixel B2) have the negative polarity (−). Accordingly, the first image is displayed only by the sub-pixels having the positive polarity and the second pixel is displayed only by the sub-pixels having the negative polarity. In the next frame, the first image is displayed only by the sub-pixels having the negative polarity, and the second pixel is displayed only by the sub-pixels having the positive polarity. That is, the first image and the second image are displayed only by the sub-pixels having the same polarity in each frame. In this case, the flicker is generated even if a slight deviation is generated in the driving signal.

In the two-screen display device having the same configuration as that in FIG. 14, what is called a "1×2 driving method" is well known as a method for suppressing the generation of the flicker. In the 1×2 driving method, the polarity of the image signal supplied to the source line is inverted in each two gate lines, and the polarities of the image signals are reversed each other in the source lines adjacent to each other.

Figure 15:
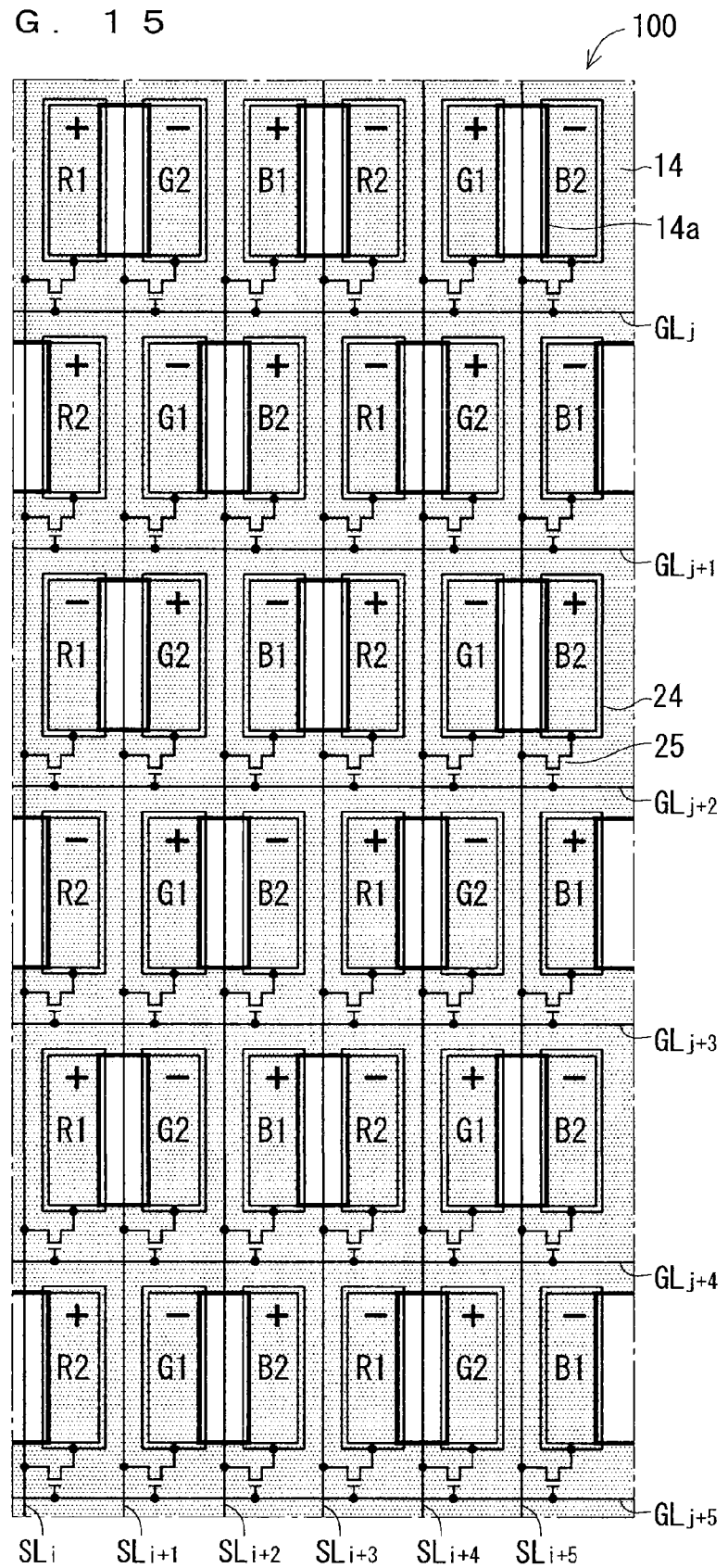
FIG. 15 is a view illustrating the polarity of each sub-pixel when the two-screen display device of the background art is driven by the 1×2 driving method.

FIG. 15 is a view illustrating the polarity (sub-pixel polarity) of the image signal supplied to each sub-pixel when the two-screen display device of the background art is driven by the 1×2 driving method. For example, it is assumed that, in a certain frame, the polarity of the image signal is sequentially changed into +, +, −, −, −, +, +, . . . from the sub-pixel driven by the jth gate line $GL_j$ in the sub-pixel column that receives the image signal from the ith source line $SL_i$ as illustrated in FIG. 15. In this case, in the sub-pixel column that receives the image signal from the (i+1)th source line $SL_{i+1}$, the polarity of the image signal is sequentially changed into −, −, +, +, −, −, . . . from the sub-pixel driven by the jth gate line $GL_j$. Similarly, the polarity of the image signal is sequentially changed into +, +, −, −, +, +, . . . from the gate line GL in the source line $SL_{i+2}$, and the polarity of the image signal is sequentially changed into −, −, +, +, +, −, −, . . . from the gate line GL in the source line $SL_{i+3}$. In the 1×2 driving method, the polarity of the sub-pixel is inverted in each frame.

That the first image and the second image are displayed only by the sub-pixels having the same polarity can be avoided In the 1×2 driving method. However, in each sub-pixel row, all the first sub-pixels have the same polarity, and all the second sub-pixels have the same polarity. For example, as illustrated in FIG. 15, in the sub-pixel row driven by the gate line $GL_j$, all the first sub-pixels have the positive polarity and all the second sub-pixels have the negative polarity. In the sub-pixel row driven by the gate line $GL_{j+1}$ and the sub-pixel row driven by the gate line $GL_{j+2}$, all the first sub-pixels have the negative polarity and all the second sub-pixels have the positive polarity. In the sub-pixel row driven by the gate line $GL_{j+3}$ and the sub-pixel row driven by the gate line $GL_{j+4}$, all the sub-pixels have the positive polarity and all the second sub-pixels have the negative polarity.

Therefore, for the 1×2 driving method, in each of the first image and the second image, the sub-pixel rows having only the positive polarity and the sub-pixel rows having only the negative polarity are repeated in each two rows. Thus, when the first image and the second image include a sub-pixel group having the same polarity, which is continuously arrayed in line, linear unevenness of luminance (that is, bright and dark lines) emerges easily in the portion of the sub-pixel group, which results in the degradation of the image quality.

The problem is not generated in the two-screen display device (FIGS. 2 and 4) of the first and second embodiments. That is, the flicker and the unevenness of luminance can be suppressed by the dot inversion driving method or the 1×2 driving method. This will be described with reference to FIGS. 6 and 7.

Figure 6:
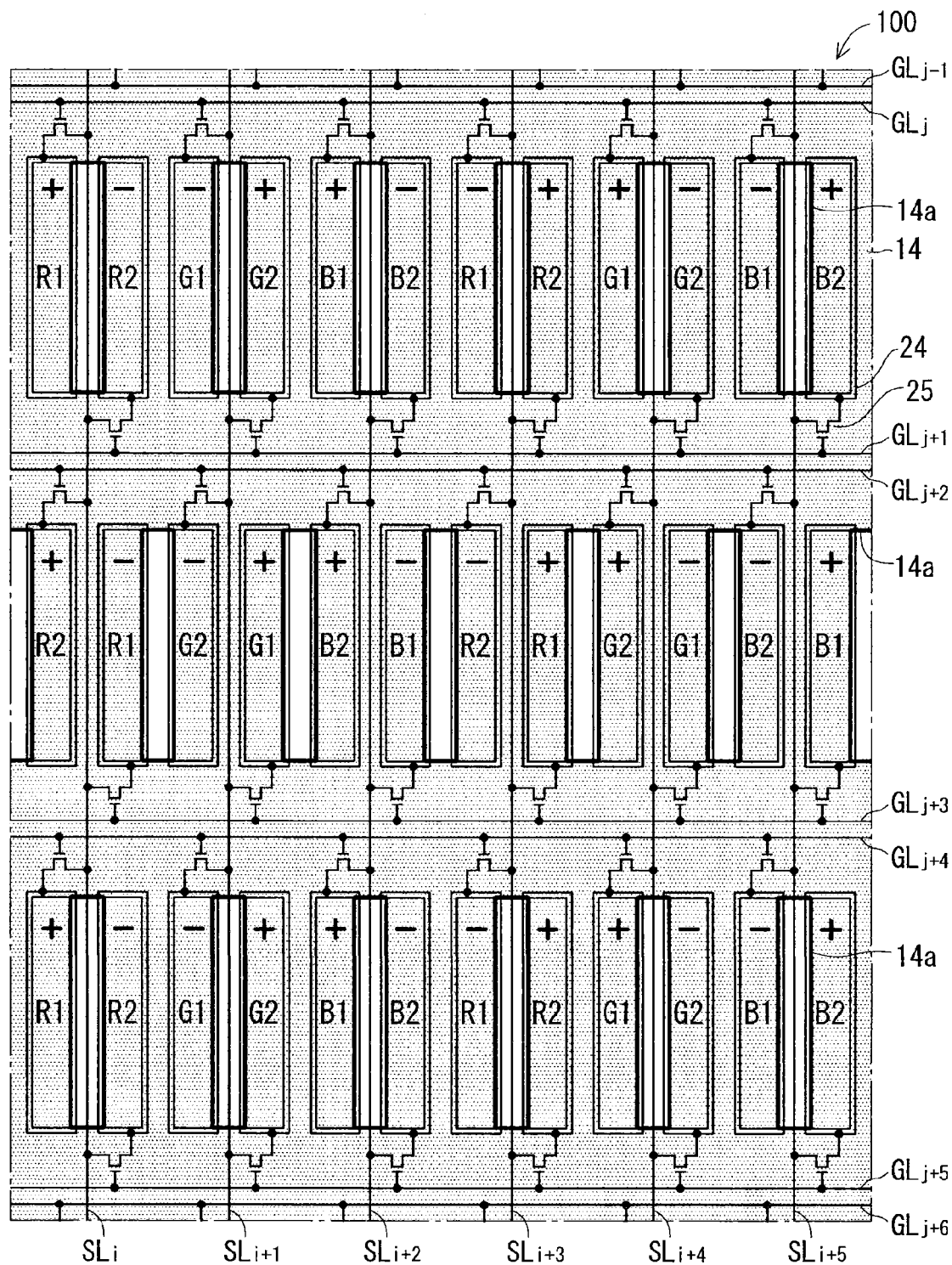
FIG. 6 is a plan view illustrating a liquid crystal display panel of a two-screen display device according to a fourth embodiment.

FIG. 6 is a view illustrating the polarity of the image signal supplied to each sub-pixel when the two-screen display device in FIG. 2 is driven by the dot inversion driving method. In the two-screen display device in FIG. 2, the one source line SL supplies the image signal to the two sub-pixel columns, and each sub-pixel row is driven by the two gate lines GL (the first sub-pixel and the second sub-pixel are driven by the different gate lines GL). Similarly to FIG. 14, the polarity of the image signal supplied to the source line SL is inverted in each gate line GL, and the polarities of the image signals are reversed each other in the source lines SL adjacent to each other. Therefore, as illustrated in FIG. 6, the polarity of the sub-pixel in each row changes horizontally into +, +, −, −, +, +, . . . .

Accordingly, the first sub-pixels (the red first sub-pixel R1, the green first sub-pixel G1, and the blue first sub-pixel B1) do not have the same polarity, and the second sub-pixels (the red second sub-pixel R2, the green second sub-pixel G2, and the blue second sub-pixel B2) do not have the same polarity, which allows the generation of the flicker to be suppressed. The generation of the linear unevenness of luminance is also prevented because the sub-pixel group having the same polarity, which is continuously arrayed in line, is not formed.

FIG. 7 is a view illustrating the polarity of the image signal supplied to each sub-pixel when the two-screen display device in FIG. 2 is driven by the 1×2 driving method. In the two-screen display device in FIG. 2, similarly to FIG. 15, the polarity of the image signal supplied to the source line SL is inverted in each two gate lines GL (in each set of the first gate line and the second gate line), and the polarities of the image signals are reversed each other in the source lines SL adjacent to each other. Therefore, as illustrated in FIG. 7, the polarity of the sub-pixel in each row changes horizontally into +, +, −, −, +, +, . . . .

Accordingly, the first sub-pixels do not have the same polarity, and the second sub-pixels do not have the same polarity, which allows the generation of the flicker to be suppressed. The generation of the linear unevenness of luminance is also prevented because the sub-pixel group having the same polarity, which is continuously arrayed in line, is not formed.

Fifth Embodiment

Figure 8:
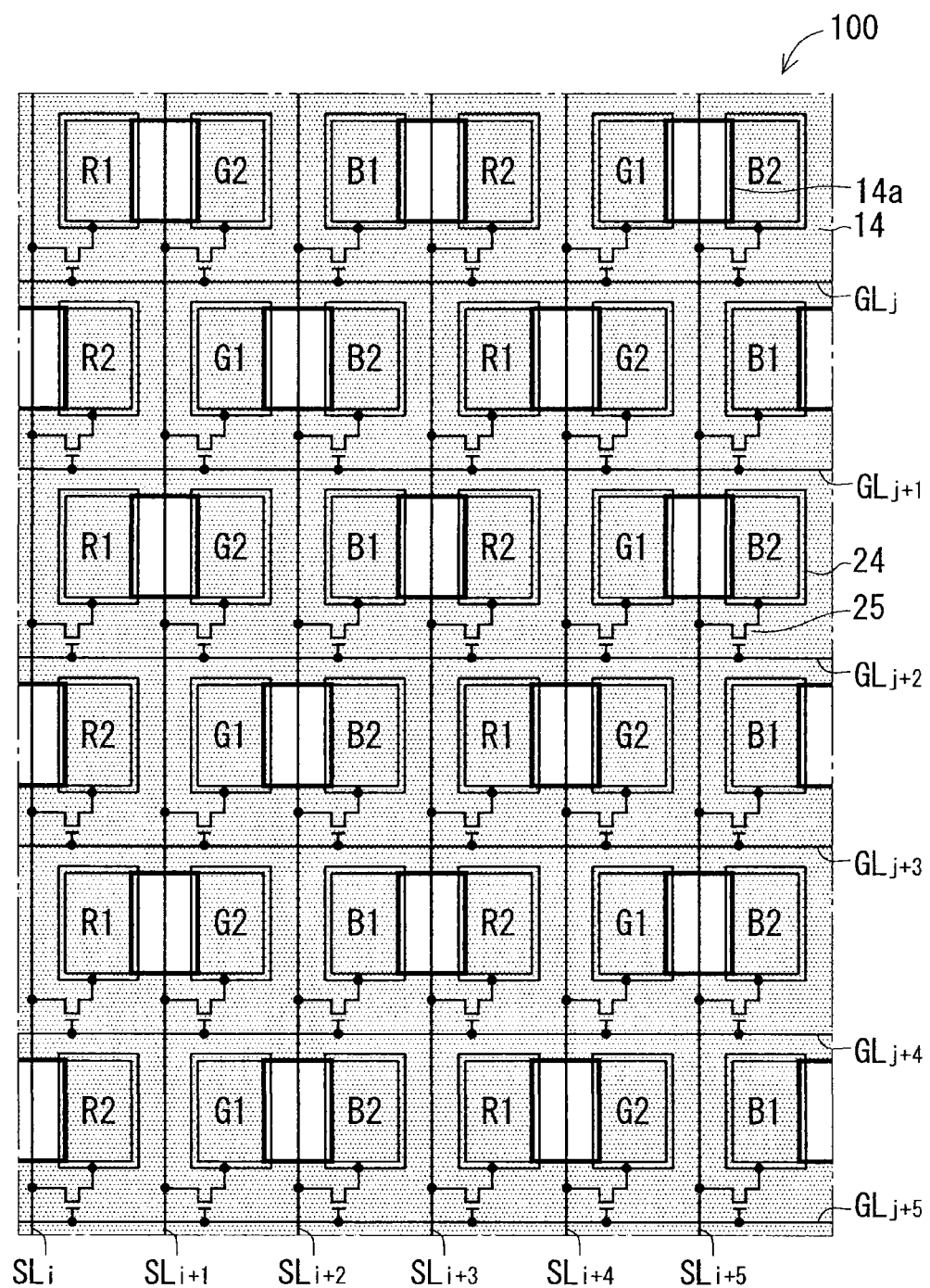
FIG. 8 is a view illustrating a method (dot inversion driving method) for driving a two-screen display device according to a fifth embodiment.

FIG. 8 is a plan view illustrating a liquid crystal display panel 100 of a two-screen display device according to a fifth embodiment. The circuit configuration of the liquid crystal display panel 100 of the fifth embodiment is similar to that of the two-screen display device of the background art in FIG. 14. However, in the liquid crystal display panel 100 of the fifth embodiment, a vertical length of each of the first sub-pixel and second sub-pixel are set to a half of that of the one-screen display device, and the sub-pixels are vertically arrayed with a half pitch of the background art. The aspect ratios of the first sub-pixel and second sub-pixel are about 3:2, and the number of sub-pixels arrayed in the vertical direction is double that of the two-screen display device of the background art.

In the fifth embodiment, one pixel (color pixel) is configured to stride the two sub-pixel rows. FIG. 9 is a view illustrating a relationship between the pixel and the sub-pixels constituting the pixel in the liquid crystal display panel 100 of the two-screen display device of the fifth embodiment. The pixel (a pixel for first image) that displays the first image includes three first sub-pixels (the red first sub-pixel R1, the green first sub-pixel G1, and the blue first sub-pixel B1) located at vertices of a triangle illustrated by a dashed line in FIG. 9. The pixel (a pixel for second image) that displays the second image includes the three first sub-pixel (red second sub-pixel R2, the green second sub-pixel G2, and the blue second sub-pixel B2) located at vertices of a triangle illustrated by an alternate long and short dash line in FIG. 9. The basic unit including the red, green, and blue color pixels, which displays each of the first image and the second image, is constructed by the six sub-pixels having three columns in the horizontal direction and two rows in the vertical direction.

In one pixel in the two-screen display device of the background art, the vertical length corresponds to one sub-pixel row, and the horizontal width corresponds to six sub-pixel columns. On the other hand, in one pixel in the two-screen display device of the fifth embodiment, as illustrated in FIG. 9, the vertical length corresponds to two sub-pixel row, and the horizontal width corresponds to three sub-pixel columns. At this point, in the fifth embodiment, the vertical length of the sub-pixel is a half of that of the two-screen display device of the background art. Accordingly, in the pixel of the two-screen display device of the fifth embodiment, the vertical length is identical to that of the two-screen display device of the background art, and the horizontal width is a half of that of the two-screen display device of the background art. As a result, the horizontal resolution in the two-screen display device of the fifth embodiment is double that of the two-screen display device of the background art, namely, the same resolution as the one-screen display device.

Plural sets of the first sub-pixels and the second sub-pixels, in each of which the first sub-pixel and the second sub-pixel are horizontally adjacent to each other, are arrayed into the two-dimensional matrix shape in the display region of the liquid crystal display panel 100. In the fifth embodiment, as illustrated in FIG. 8, the first sub-pixels and the second sub-pixels are alternately disposed in the vertical direction (the direction in which the source line SL extends). That is, the positional relationship between the first sub-pixel and the second sub-pixel inverts in the sub-pixel rows adjacent to each other. Therefore, the openings 14*a* of the parallax barrier 14 are arrayed into the zigzag shape. Because the sub-pixels are vertically arrayed with a half pitch of the background art, the openings 14*a* are also arrayed with a half vertical pitch of the background art.

Each of the first sub-pixel and the second sub-pixel produces one of the red, green, and blue colors. In the first embodiment, the first sub-pixels and the second sub-pixels are arrayed such that the color produced by each of the first sub-pixel and the second sub-pixel changes regularly in each sub-pixel in the horizontal direction. In the example in FIG. 8, the red first sub-pixel R1, the green second sub-pixel G2, the blue first sub-pixel B1, the red second sub-pixel R2, the green first sub-pixel G1, the blue second sub-pixel B2, the red first sub-pixel R1, . . . are periodically arrayed.

When the front of the liquid crystal display panel 100 is viewed from the right, the red first sub-pixel R1, the blue first sub-pixel B1, and the green first sub-pixel G1, which are arrayed at the vertices of the triangle, constitute one pixel because the second sub-pixel is shielded by the parallax barrier 14. As a result, the first image is viewed from the right toward the front of the liquid crystal display panel 100.

On the other hand, when the front of the liquid crystal display panel 100 is viewed from the left, the green second sub-pixel G2, the red second sub-pixel R2, and the blue second sub-pixel B2, which are arrayed at the vertices of the triangle, constitute one pixel because the first sub-pixel is shielded by the parallax barrier 14. As a result, the second image is viewed from the left toward the front of the liquid crystal display panel 100.

The source line SL extends in the vertical direction, and is disposed between the sub-pixel columns. The image signal is supplied to each sub-pixel column from the individual source line SL. In the fifth embodiment, the image signal is supplied from the individual source line SL to the first sub-pixel and the second sub-pixel, which are adjacent to each other. Therefore, the number of source lines SL is equal to the number of sub-pixel columns, namely, the number of source lines SL is equal to that of the two-screen display device of the background art.

Because the source line SL is disposed between the sub-pixel columns, the opening 14a disposed in the zigzag manner in the parallax barrier 14 is located above the source line SL.

On the other hand, each gate line GL extends in the horizontal direction, and is disposed between the sub-pixel rows. One gate line GL is provided for each sub-pixel row, and the sub-pixels in the same row are driven by the same gate line GL. At this point, in the fifth embodiment, the vertical length of the sub-pixel is a half of that of the two-screen display device of the background art, and the sub-pixels are arrayed with a half pitch of the background art. Therefore, the number of gate lines GL is double that of the two-screen display device of the background art.

In the two-screen display device of the fifth embodiment, the vertical length of each sub-pixel is a half of that of the two-screen display device of the background art, the aspect ratio is set to about 3:2, and the pixel (color pixel) is configured to stride the two sub-pixel rows. The horizontal width of one pixel is a half (three sub-pixel rows) of the background art. Therefore, while the size of the display region is maintained, the horizontal resolution is double that of the two-screen display device of the background art, namely, equal to that of the one-screen display device. As a result, the first image and the second image can be displayed with the same resolution as the one-screen display device.

In the two-screen display device of the fifth embodiment, the horizontal width of the sub-pixel and the horizontal pitch of the sub-pixel are equal to those of the two-screen display device of the background art. The gap between the parallax barrier and the pixel may be equal to that of the two-screen display device of the background art. For example, like the configuration in FIG. 1, the thickness of the first substrate 11 may be equal to that of the background art even if the distance between the parallax barrier and the pixel (the distance between the black matrix 12 and the parallax barrier 14) is defined by the thickness of the first substrate 11. Therefore, a production process for the display device of the background art can easily be applied to suppress the increase of the production cost.

Sixth Embodiment

Figure 10:
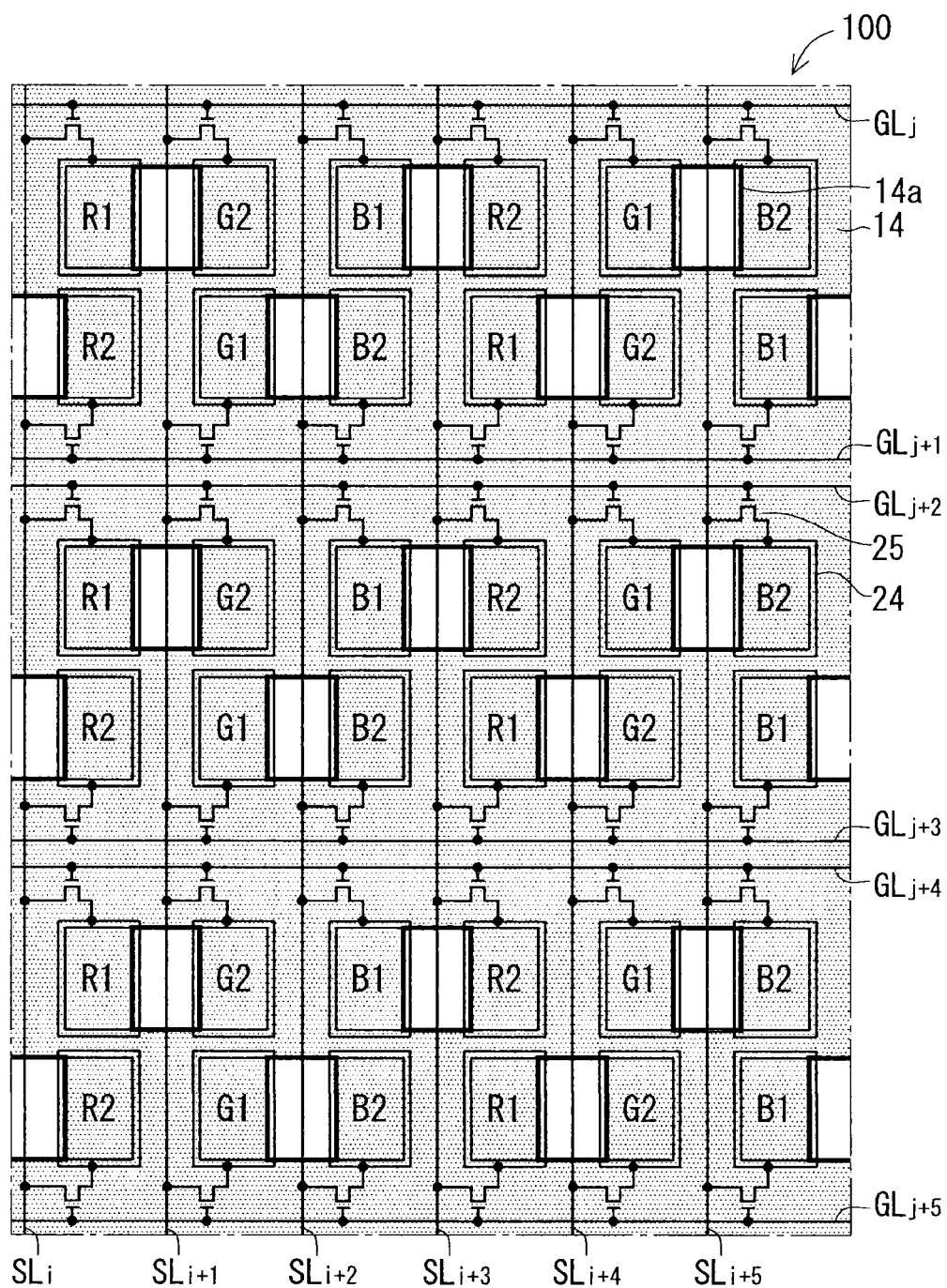
FIG. 10 is a plan view illustrating a liquid crystal display panel of a two-screen display device according to a sixth embodiment.

FIG. 10 is a plan view illustrating a liquid crystal display panel 100 of a two-screen display device according to a sixth embodiment of the present invention. In the liquid crystal display panel 100 of the sixth embodiment, the circuit configuration is identical to that of the fifth embodiment, while a layout of each element differs from that of the fifth embodiment.

In the sixth embodiment, the gate line GL is not disposed one each between the adjacent sub-pixel rows, but two gate lines GL are disposed respectively every two sub-pixel rows. Each of the two sub-pixel rows between which the two gate lines GL are interposed is driven by the gate lines GL closer to the sub-pixel row. Referring to FIG. 10, in the two gate lines $GL_{j+1}$ and $GL_{j+2}$ adjacent to each other, the upper gate line $GL_{j+1}$ drives the sub-pixel row located on the upper side, and the lower gate line $GL_{j+2}$ drives the sub-pixel row located on the lower side.

In other words, the two sub-pixel rows adjacent to each other are disposed between the gate line GL that drives one of the sub-pixel rows and the gate line GL that drives the other sub-pixel row. In FIG. 10, one of the two sub-pixel rows disposed between the gate line $GL_j$ and the gate line $GL_{j+1}$ is driven by the gate line $GL_j$, and the other is driven by the gate line $GL_{j+1}$.

In the sixth embodiment, the pixel (color pixel) is configured to stride the two sub-pixel rows like the configuration in FIG. 9. In the sixth embodiment, each two sub-pixel rows can be disposed close to each other, so that the three sub-pixels constituting one pixel can be disposed close to one another.

Seventh Embodiment

Figure 11:
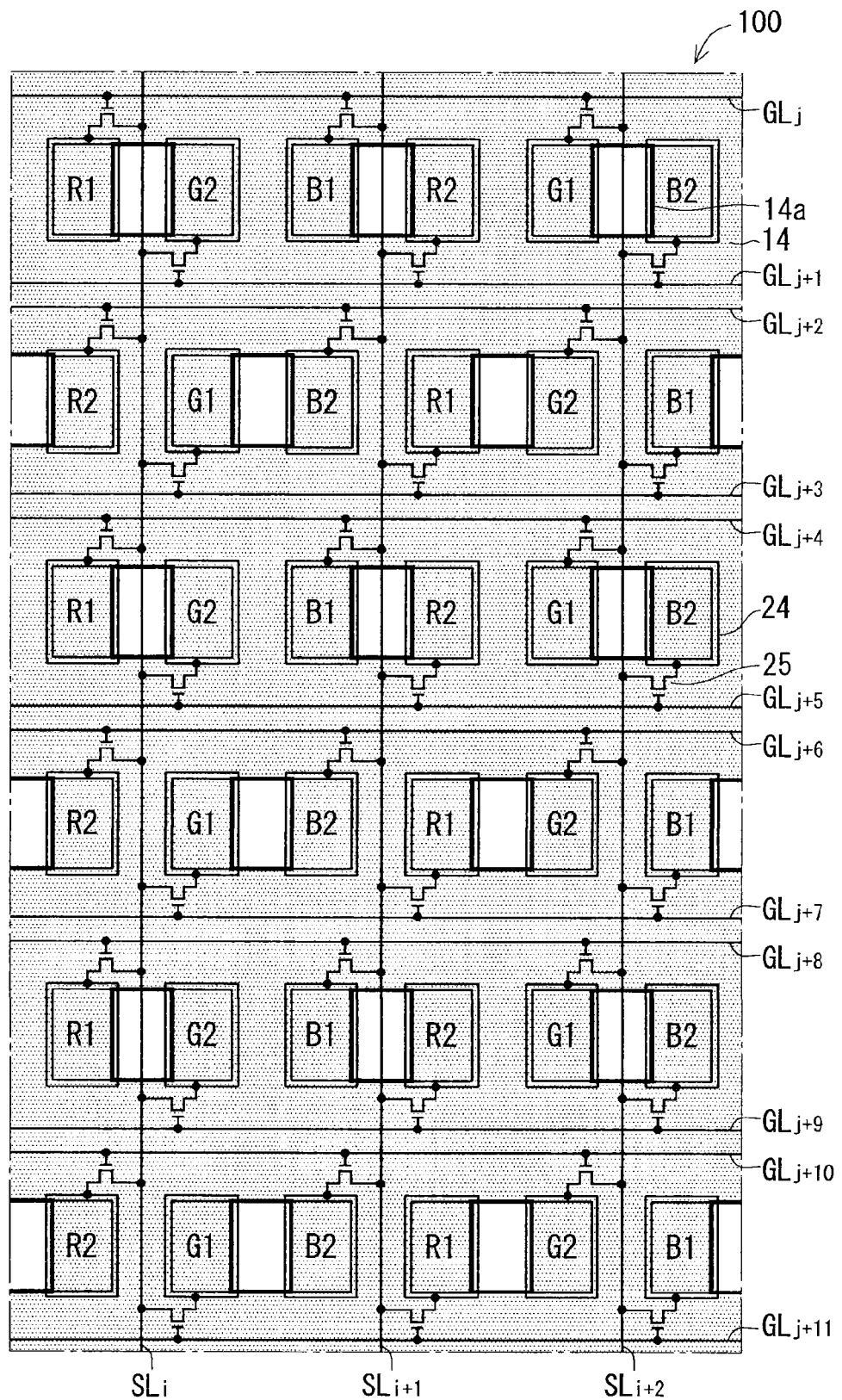
FIG. 11 is a plan view illustrating a liquid crystal display panel of a two-screen display device according to a seventh embodiment.

In a seventh embodiment, the circuit configuration of the first embodiment is applied to the two-screen display device of the fifth embodiment (FIG. 8). FIG. 11 is a plan view illustrating a liquid crystal display panel 100 of a two-screen display device of the seventh embodiment.

In the liquid crystal display panel 100 of the two-screen display device of the seventh embodiment, the size and layout of the sub-pixel are identical to those of the fifth embodiment. That is, the aspect ratio of the sub-pixel is about 3:2, and the sub-pixels are vertically arrayed with a half pitch of the background art. As illustrated in FIG. 9, one pixel (color pixel) row is constructed by two sub-pixels. Therefore, the horizontal resolution of the liquid crystal display panel 100 is double that of the two-screen display device of the background art, namely, equal to that of the one-screen display device.

In the seventh embodiment, the first sub-pixels and the second sub-pixels are alternately disposed in the horizontal direction and the vertical direction, and the openings 14a of the parallax barrier 14 are provided in the zigzag manner. Because the sub-pixels are vertically arrayed with a half pitch of the background art, the openings 14a are also arrayed with a half vertical pitch of the background art.

Each of the first sub-pixel and the second sub-pixel produces one of the red, green, and blue colors. In the first embodiment, the first sub-pixels and the second sub-pixels are arrayed such that the color produced by each of the first sub-pixel and the second sub-pixel changes regularly in each sub-pixel in the horizontal direction. In the example in FIG. 11, the red first sub-pixel R1, the green second sub-pixel G2, the blue first sub-pixel B1, the red second sub-pixel R2, the green first sub-pixel G1, the blue second sub-pixel B2, the red first sub-pixel R1, . . . are periodically arrayed.

When the front of the liquid crystal display panel 100 is viewed from the right, the red first sub-pixel R1, the blue first sub-pixel B1, and the green first sub-pixel G1, which are arrayed at the vertices of the triangle, constitute one pixel because the second sub-pixel is shielded by the parallax barrier 14. As a result, the first image is viewed from the right toward the front of the liquid crystal display panel 100.

On the other hand, when the front of the liquid crystal display panel 100 is viewed from the left, the green second sub-pixel G2, the red second sub-pixel R2, and the blue second sub-pixel B2, which are arrayed at the vertices of the triangle, constitute one pixel because the first sub-pixel is shielded by the parallax barrier 14. As a result, the second image is viewed from the left toward the front of the liquid crystal display panel 100.

As illustrated in FIG. 11, the source line SL extends in the vertical direction, and is disposed between the first sub-pixel and the second sub-pixel, which are horizontally adjacent to each other. Each source line SL is configured to supply the image signal to both the first sub-pixel and the second sub-pixel, which are adjacent to each other with the source line SL interposed therebetween. Accordingly, both the TFT 25 connected to the first sub-pixel and the TFT 25 connected to the adjacent second sub-pixel are connected to the source line SL.

Therefore, the number of source lines SL may be a half of the number of sub-pixel columns, and the source line SL is disposed in each two sub-pixel columns as illustrated in FIG. 11. In the two-screen display device of the seventh embodiment, because the number of sub-pixel rows in the horizontal direction is equal to that of the background art, the number of source lines SL may be a half of the background art.

The source line SL is disposed between the first sub-pixel and the second sub-pixel in each two sub-pixel columns, and the openings 14*a* are arrayed in the zigzag manner. Therefore, as illustrated in FIG. 11, the row in which the opening 14*a* is provided on the source line SL and the row in which the opening 14*a* is not provided are alternately arrayed in the display region. In a certain sub-pixel row, the opening 14*a* is provided in the region between the first sub-pixel and the second sub-pixel, which receive the image signal from the same source line SL. In the adjacent row, the opening 14*a* is provided in the region between the first sub-pixel and the second sub-pixel, which receive the image signal from the different source lines SL.

On the other hand, each gate line GL extends in the horizontal direction, and is disposed between the sub-pixel rows. In the seventh embodiment, the gate line GL (first gate line) that drives the first sub-pixel and the gate line GL (second gate line) that drives the second sub-pixel are provided for each sub-pixel row. Referring to FIG. 11, the odd-numbered gate line GL is connected to the gate electrode of the TFT 25 which is connected to the sub-pixel arranged on the left side of each source line SL, and the even-numbered gate line GL is connected to the gate electrode of the TFT 25 which is connected to the sub-pixel arranged on the right side of each source line SL (in FIG. 11, j is an odd number).

That is, two gate lines GL are provided in each sub-pixel row. In the seventh embodiment, the number of sub-pixel rows is double that of the background art. Therefore, the number of gate lines GL is four times that of the background art.

In the seventh embodiment, each sub-pixel row is disposed between the gate line GL that drives the first sub-pixel belonging to the sub-pixel row and the gate line GL that drives the second sub-pixel. In other words, the two gate lines GL that drive the sub-pixel row are disposed such that the sub-pixel row which is driven by the two gate lines GL is interposed therebetween. Therefore, the two gate lines GL are provided between the sub-pixel rows as illustrated in FIG. 11.

In the two-screen display device of the seventh embodiment, the horizontal length of each sub-pixel is a half of that of the two-screen display device of the background art, the aspect ratio is set to about 3:2, and the pixel (color pixel) is configured to stride the two sub-pixel rows. The horizontal width of one pixel is a half (three sub-pixel rows) of the background art. Therefore, while the size of the display region is maintained, the horizontal resolution is double that of the two-screen display device of the background art, namely, equal to that of the one-screen display device. As a result, the first image and the second image can be displayed with the same resolution as the one-screen display device.

In the two-screen display device of the seventh embodiment, the horizontal width of the sub-pixel and the horizontal pitch of the sub-pixel are equal to those of the two-screen display device of the background art. The gap between the parallax barrier and the pixel may be equal to that of the two-screen display device of the background art. Accordingly, for example, like the configuration in FIG. 1, the thickness of the first substrate 11 may be equal to that of the background art even if the distance between the parallax barrier and the pixel (the distance between the black matrix 12 and the parallax barrier 14) is defined by the thickness of the first substrate 11. Therefore, a production process for the display device of the background art can easily be applied to suppress the increase of the production cost.

Eighth Embodiment

In the two-screen display device (FIG. 11) of the seventh embodiment, the flicker and the unevenness of luminance can effectively be suppressed by the dot inversion driving method or the 1×2 driving method.

Figure 12:
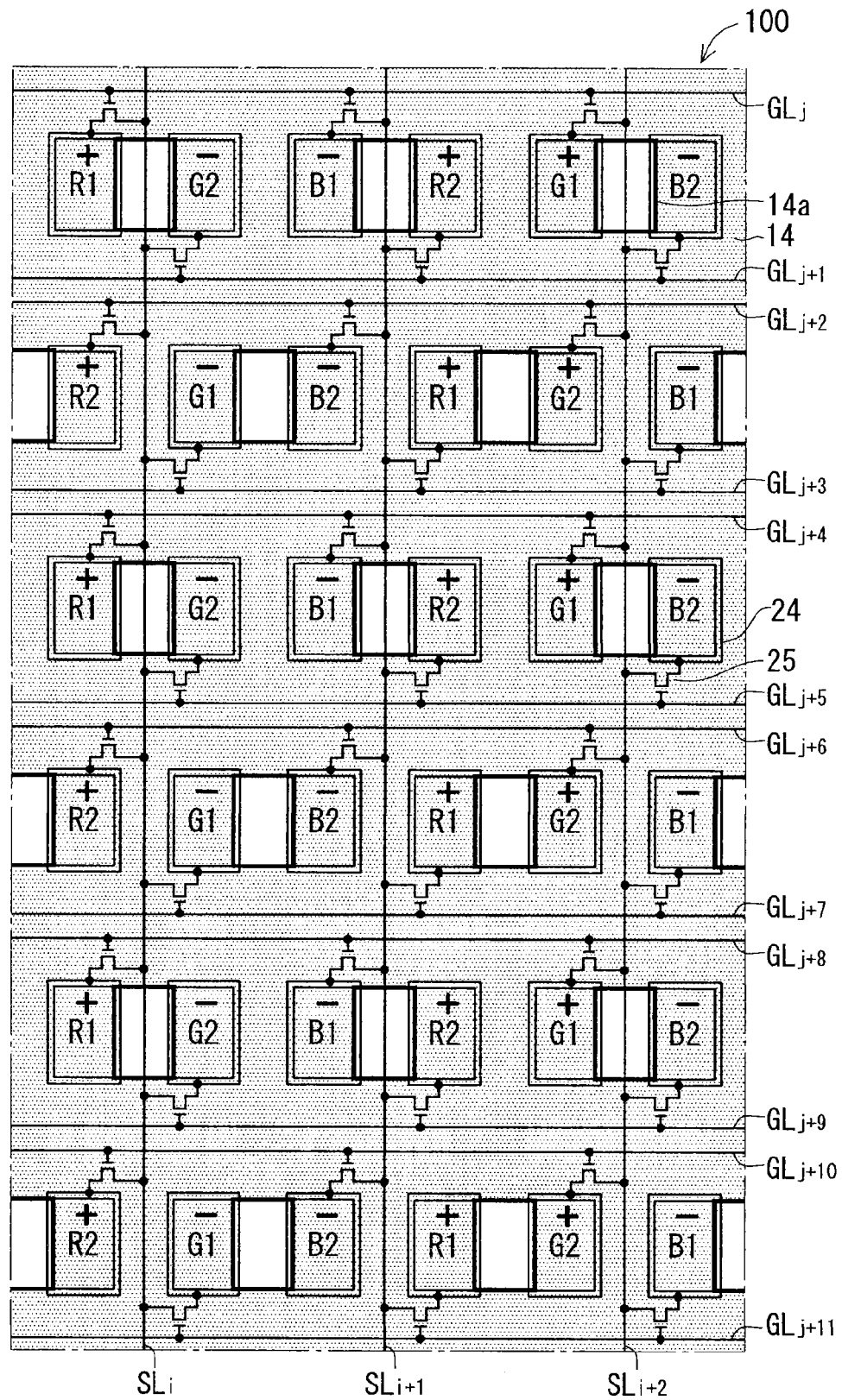
FIG. 12 is a plan view illustrating a liquid crystal display panel of a two-screen display device according to an eighth embodiment.

FIG. 12 is a view illustrating the polarity of the image signal supplied to each sub-pixel when the two-screen display device in FIG. 11 is driven by the dot inversion driving method. In the two-screen display device in FIG. 11, the one source line SL supplies the image signal to the two sub-pixel columns, and each sub-pixel row is driven by the two gate lines GL (the first sub-pixel and the second sub-pixel are driven by the different gate lines GL). Similarly to FIG. 14, the polarity of the image signal supplied to the source line SL is inverted in each gate line GL, and the polarities of the image signals are reversed each other in the source lines SL adjacent to each other. Therefore, as illustrated in FIG. 6, the polarity of the sub-pixel in each row changes horizontally into +, +, −, −, +, +, . . . .

Accordingly, the first sub-pixels (the red first sub-pixel R1, the green first sub-pixel G1, and the blue first sub-pixel B1) do not have the same polarity, and the second sub-pixels (the red second sub-pixel R2, the green second sub-pixel G2, and the blue second sub-pixel B2) do not have the same polarity, which allows the generation of the flicker to be suppressed. The generation of the linear unevenness of luminance is also prevented because the sub-pixel group having the same polarity, which is continuously arrayed in line, is not formed.

Figure 13:
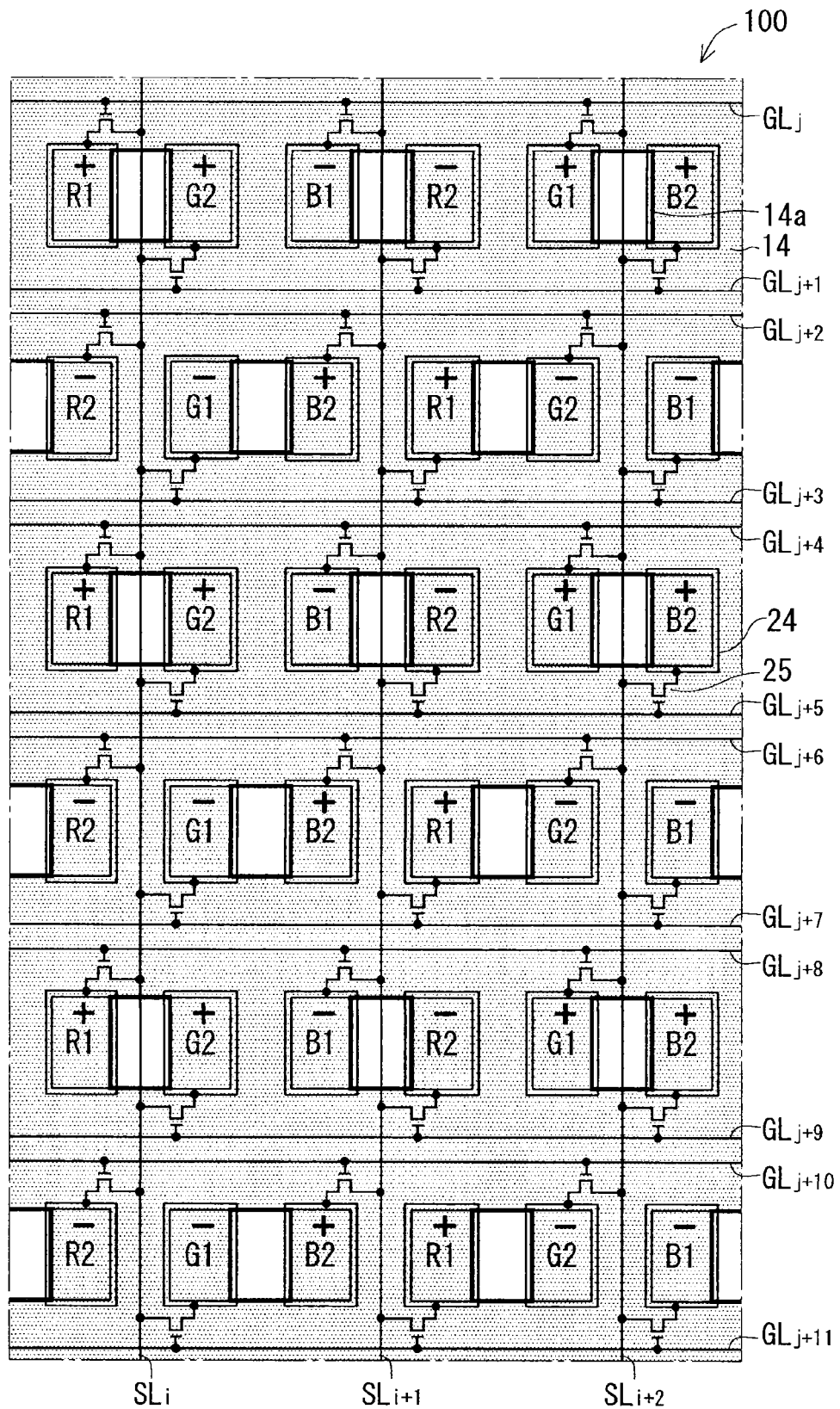
FIG. 13 is a plan view illustrating the liquid crystal display panel of the two-screen display device of the eighth embodiment.

FIG. 13 is a view illustrating the polarity of the image signal supplied to each sub-pixel when the two-screen display device in FIG. 11 is driven by the 1×2 driving method. That is, the polarity of the image signal supplied to the source line SL is inverted in each two gate lines GL (in each set of the first gate line and the second gate line), and the polarities of the image signals are reversed each other in the source lines SL adjacent to each other. As with the configuration in FIG. 7, the polarity of each sub-pixel in each row changes horizontally into +, +, −, −, +, +, . . . .

Accordingly, the first sub-pixels do not have the same polarity, and the second sub-pixels do not have the same polarity, which allows the generation of the flicker to be suppressed. The generation of the linear unevenness of luminance is also prevented because the sub-pixel group having the same polarity, which is continuously arrayed in line, is not formed.

A free combination of the embodiments and changes and modifications of the embodiments can be made without departing from the scope of the present invention.

While the invention has been shown and described in detail, the foregoing description is in all aspects illustrative and not restrictive. It is therefore understood that numerous modifications and variations can be devised without departing from the scope of the invention.

What is claimed is:

1. A two-screen display device comprising:
a first sub-pixel that is of a sub-pixel for a first image and a second sub-pixel that is of a sub-pixel for a second image, the first sub-pixel and the second sub-pixel being adjacent to each other, each of the first sub-pixel and the second sub-pixel having an aspect ratio of about 6:1, the aspect ratio of each sub-pixel corresponding to a ratio of a repetition unit of sub-pixels in a row direction to a repetition unit of sub-pixels in a column direction;
a source line that supplies an image signal to both said first sub-pixel and said second sub-pixel;
a first switching element that is connected between said source line and said first sub-pixel;
a second switching element that is connected between said source line and said second sub-pixel;
a first gate line that is of a gate line supplying a driving signal to a control electrode of said first switching element to drive said first sub-pixel;
a second gate line that is of a gate line supplying a driving signal to a control electrode of said second switching element to drive said second sub-pixel;
a display region in which a plurality of sets of said first sub-pixel and said second sub-pixel are arrayed into a two-dimensional matrix shape; and
a parallax barrier that is of a light shielding film provided on said display region, said parallax barrier including a plurality of openings arrayed in a region between said first sub-pixel and said second sub-pixel, which are adjacent to each other
a first row in which said openings of said parallax barrier are disposed in a region between said first sub-pixel and said second sub-pixel, which receive the image signal from the identical source line, and a second row in which said openings of said parallax barrier are disposed in a region between said first sub-pixel and said second sub-pixel, which receive the image signal from the different source lines, are alternately disposed in said display region; and
the openings of said parallax barrier in the first row are each shifted in an extending direction of said gate lines from the openings of said parallax barrier in the second row.

2. The two-screen display device according to claim 1, wherein
said source line extends between said first sub-pixel and said second sub-pixel, to which the source line supplies an image signal,
each of said first gate line and said second gate line extends in a direction intersecting said source line, and said first gate line and said second gate line are disposed while said first sub-pixel driven by the first gate line and said second sub-pixel driven by the second gate line are interposed between the first gate line and the second gate line.

3. The two-screen display device according to claim 1, wherein
the color produced by each of said first sub-pixel and said second sub-pixel is arrayed in said display region while regularly changing in each sub-pixel in an extending direction of said gate lines.

4. The two-screen display device according to claim 1, wherein
each of said first sub-pixel and said second sub-pixel produces one of red, green, and blue colors,
the color produced by each of said first sub-pixel and said second sub-pixel is regularly arrayed in said display region in an extending direction of said gate lines, and said first sub-pixel and said second sub-pixel, which receive the image signal from said identical source line, produce an identical color light.

5. The two-screen display device according to claim 1, wherein
a polarity of said image signal supplied to said source line is inverted in each of said gate line, and reversed with respect to an image signal of said adjacent source line.

6. The two-screen display device according to claim 1, wherein
a polarity of said image signal supplied to said source line is inverted in each set of said first gate line and said second gate line, and reversed with respect to an image signal of said adjacent source line.

7. The two-screen display device according to claim 1, wherein said parallax barrier is made of metal or black resin.

* * * * *